United States Patent
Kim et al.

(10) Patent No.: US 11,800,341 B2
(45) Date of Patent: Oct. 24, 2023

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Sangbum Kim, Suwon-si (KR); Sangkyu Baek, Suwon-si (KR); Soenghun Kim, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 17/309,174

(22) PCT Filed: Nov. 1, 2019

(86) PCT No.: PCT/KR2019/014721
§ 371 (c)(1),
(2) Date: May 3, 2021

(87) PCT Pub. No.: WO2020/091510
PCT Pub. Date: May 7, 2020

(65) Prior Publication Data
US 2022/0030409 A1    Jan. 27, 2022

(30) Foreign Application Priority Data

Nov. 1, 2018  (KR) .................. 10-2018-0133141
Nov. 9, 2018  (KR) .................. 10-2018-0137603

(51) Int. Cl.
*H04M 11/04*    (2006.01)
*H04W 4/00*     (2018.01)
(Continued)

(52) U.S. Cl.
CPC ............ *H04W 4/90* (2018.02); *H04W 4/70* (2018.02); *H04W 72/0466* (2013.01); *H04W 72/23* (2023.01)

(58) Field of Classification Search
CPC ......... H04W 4/90; H04W 4/70; H04W 72/23; H04W 72/0466
(Continued)

(56) References Cited

U.S. PATENT DOCUMENTS 10,904,734 B2    1/2021  Lee et al.
2015/0223028 A1  8/2015  Wang et al.
(Continued)

FOREIGN PATENT DOCUMENTS

KR    10-2017-0128209 A    11/2017
KR    10-2018-0020316 A    2/2018

OTHER PUBLICATIONS

International Search Report and Written Opinion of the International Searching Authority dated Feb. 6, 2020 in connection with International Application No. PCT/KR2019/014721, 11 pages.
(Continued)

*Primary Examiner* — Mark G. Pannell

(57) ABSTRACT

According to some embodiments of the disclosure, a method of receiving, by a terminal, public warning system (PWS) information includes: receiving, from a base station, system information including configuration information related to a coverage enhancement (CE) mode; receiving, in a narrow bandwidth narrower than a system bandwidth, downlink control information (DCI) indicating that the PWS information is to be broadcast in the system bandwidth, in the CE mode operating based on the system information; and obtaining the PWS information in the system bandwidth, based on the DCI.

14 Claims, 29 Drawing Sheets

(51) Int. Cl.
*H04W 4/90* (2018.01)
*H04W 4/70* (2018.01)
*H04W 72/044* (2023.01)
*H04W 72/23* (2023.01)

(58) Field of Classification Search
USPC ........................................ 455/404.1
See application file for complete search history.

(56) References Cited

U.S. PATENT DOCUMENTS

| | | |
|---|---|---|
| 2016/0270038 A1 | 9/2016 | Papasakellariou |
| 2017/0105166 A1 | 4/2017 | Lee et al. |
| 2017/0367070 A1 | 12/2017 | Zhang et al. |
| 2018/0212736 A1 | 7/2018 | Chatterjee et al. |
| 2018/0234826 A1* | 8/2018 | Määttanen ............. H04W 4/90 |
| 2019/0110179 A1 | 4/2019 | Lee et al. |
| 2019/0124625 A1* | 4/2019 | Takeda ................. H04W 48/10 |

OTHER PUBLICATIONS

Translation of the Written Opinion of the International Searching Authority dated Feb. 6, 2020 in connection with International Application No. PCT/KR2019/014721, 4 pages.
Office Action dated Feb. 19, 2023, in connection with Korean Application No. 10-2018-0137603, 6 pages.

\* cited by examiner

- The IE schedulingInfo can be reused or new info can be introduced to reduce the signaling overhead
- for instance, the ETWS/CMAS scheduling info is indicated in the relative #frame and #subframe based on the timing to send PWS-RNTI

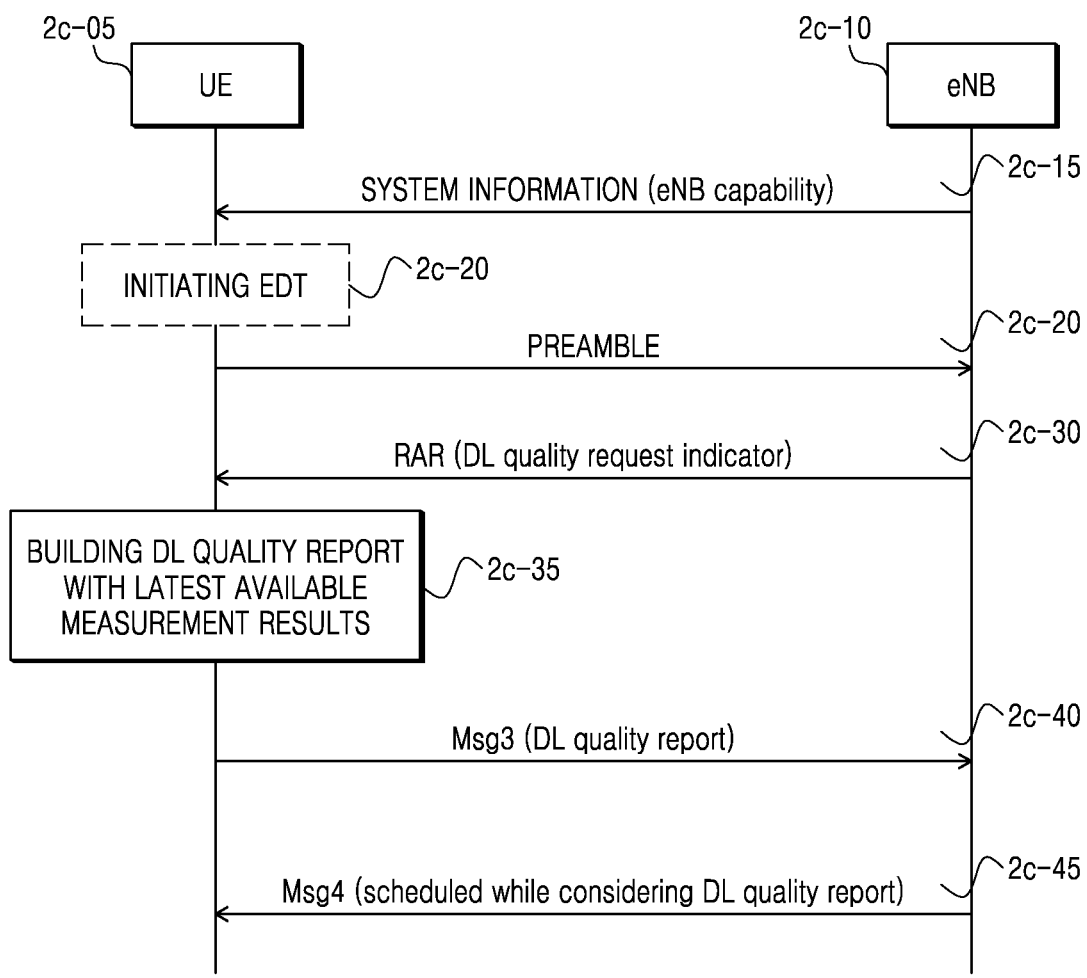

(a)

(b)

(a) short DL quality report (b) short DL quality report (c) long DL quality report

FIG. 2F

| RSRP/RSRQ | RSRP/RSRQ level |
|---|---|
| 0 | RSRP/RSRQ_0 |
| 1 | RSRP/RSRQ_1 |
| 2 | RSRP/RSRQ_2 |
| ⋮ | ⋮ |
| n | RSRP/RSRQ_n |

2f-05

2f-10

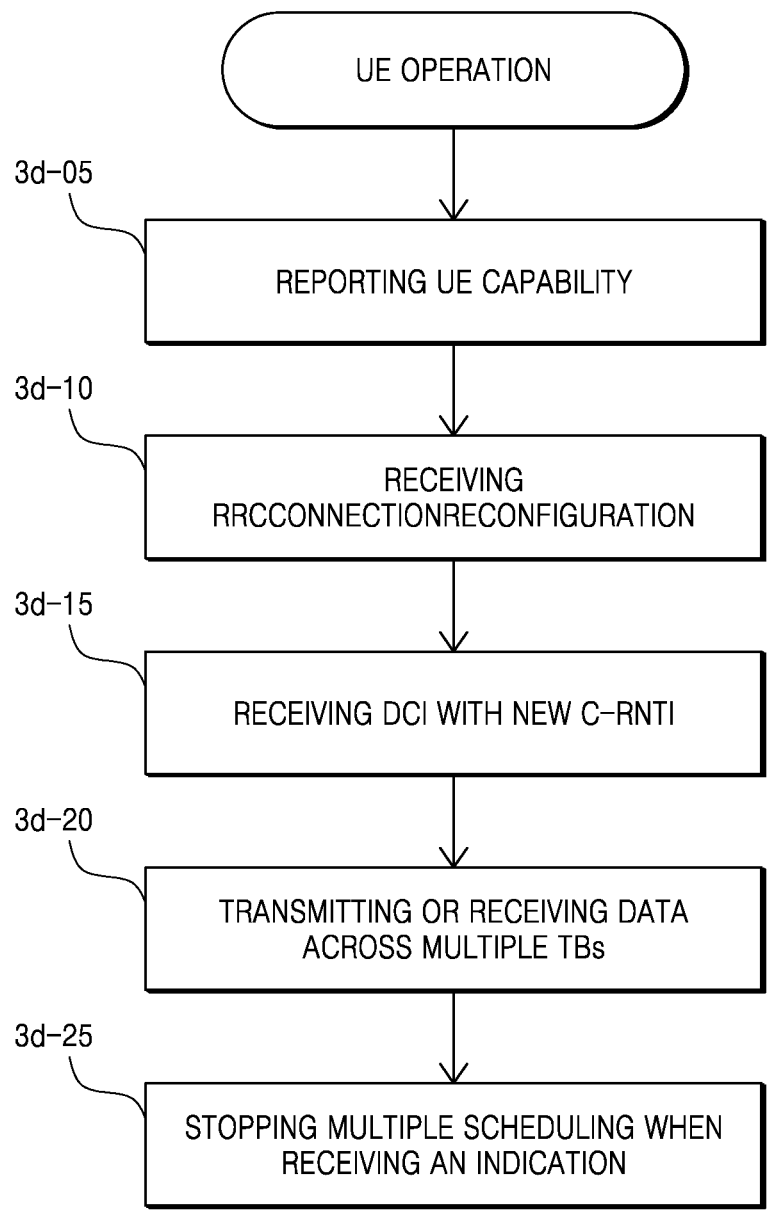

METHOD AND APPARATUS FOR TRANSMITTING AND RECEIVING DATA IN WIRELESS COMMUNICATION SYSTEM

CROSS-REFERENCE TO RELATED APPLICATIONS

This application is a 371 National Stage of International Application No. PCT/KR2019/014721, filed Nov. 1, 2019, which claims priority to Korean Patent Application No. 10-2018-0133141, filed Nov. 1, 2018, and Korean Patent Application No. 10-2018-0137603, filed Nov. 9, 2018, the disclosures of which are herein incorporated by reference in their entirety.

BACKGROUND

1. Field

The disclosure relates to methods and apparatuses for transmitting and receiving data in a wireless communication system.

2. Description of Related Art

To meet the increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post Long Term Evolution (post-LTE)' systems. To achieve high data rates, implementation of 5G communication systems in an ultra-high frequency or millimeter-wave (mm-Wave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

As various services may be provided according to the foregoing and the development of wireless communication systems, methods for smoothly providing such services are required.

SUMMARY

Described embodiments provide apparatuses and methods capable of effectively providing services in a wireless communication system.

According to an embodiment of the disclosure, a method of receiving, by a terminal, public warning system (PWS) information includes: receiving, from a base station, system information including configuration information related to a coverage enhancement (CE) mode; receiving, in a narrow bandwidth narrower than a system bandwidth, downlink control information (DCI) indicating that the PWS information is to be broadcast in the system bandwidth, in the CE mode operating based on the system information; and obtaining the PWS information in the system bandwidth based on the DCI.

The terminal may be a terminal supporting the CE mode, rather than a machine type communication (MTC) terminal.

The PWS information may include commercial mobile alert system information or earthquake and tsunami warning system information.

The DCI may be received through an MTC physical downlink control channel (MPDCCH) in the narrow bandwidth.

The DCI may correspond to SI-RNTI.

The PWS information may be broadcast in SIB10, SIB11, or SIB12.

Also, according to an embodiment of the disclosure, a method of broadcasting, by a base station, public warning system (PWS) information includes: transmitting, to a terminal, system information including configuration information related to a coverage enhancement (CE) mode; performing random access with the terminal based on the system information; transmitting, in a narrow bandwidth narrower than a system bandwidth, downlink control information (DCI) indicating that the PWS information is to be broadcast in the system bandwidth, based on the random access; and broadcasting the PWS information in the system bandwidth corresponding to scheduling information of the DCI.

According to an embodiment of the disclosure, a terminal supporting a coverage enhancement (CE) mode includes: a transceiver; and at least one processor connected to the transceiver, wherein the at least one processor is configured to receive system information from a base station, receive downlink control information (DCI) indicating that the PWS information is broadcast in a system bandwidth, in a narrow bandwidth narrower than the system bandwidth, in the CE mode operating based on the system information, and obtain the PWS information in the system bandwidth based on the DCI.

According to an embodiment of the disclosure, a base station supporting a coverage enhancement (CE) mode includes: a transceiver; and at least one processor connected to the transceiver, wherein the at least one processor is configured to transmit, to a terminal, system information including configuration information related to the CE mode, perform random access with the terminal based on the system information, transmit, in a narrow bandwidth narrower than a system bandwidth, downlink control information (DCI) indicating that the PWS information is to be broadcast in the system bandwidth, based on the random access, and broadcast the PWS information in the system bandwidth corresponding to scheduling information of the DCI.

The described embodiments provide apparatuses and methods capable of effectively providing services in a wireless communication system.

BRIEF DESCRIPTION OF THE DRAWINGS

FIG. 2C is a flowchart illustrating a process of reporting downlink channel quality information through msg3, according to some embodiments.

FIG. 2F is a diagram illustrating a method of indicating downlink channel quality information, according to some embodiments.

FIG. 3D is a flowchart illustrating an operation of a terminal according to some embodiments.

DETAILED DESCRIPTION

Figure 1A:
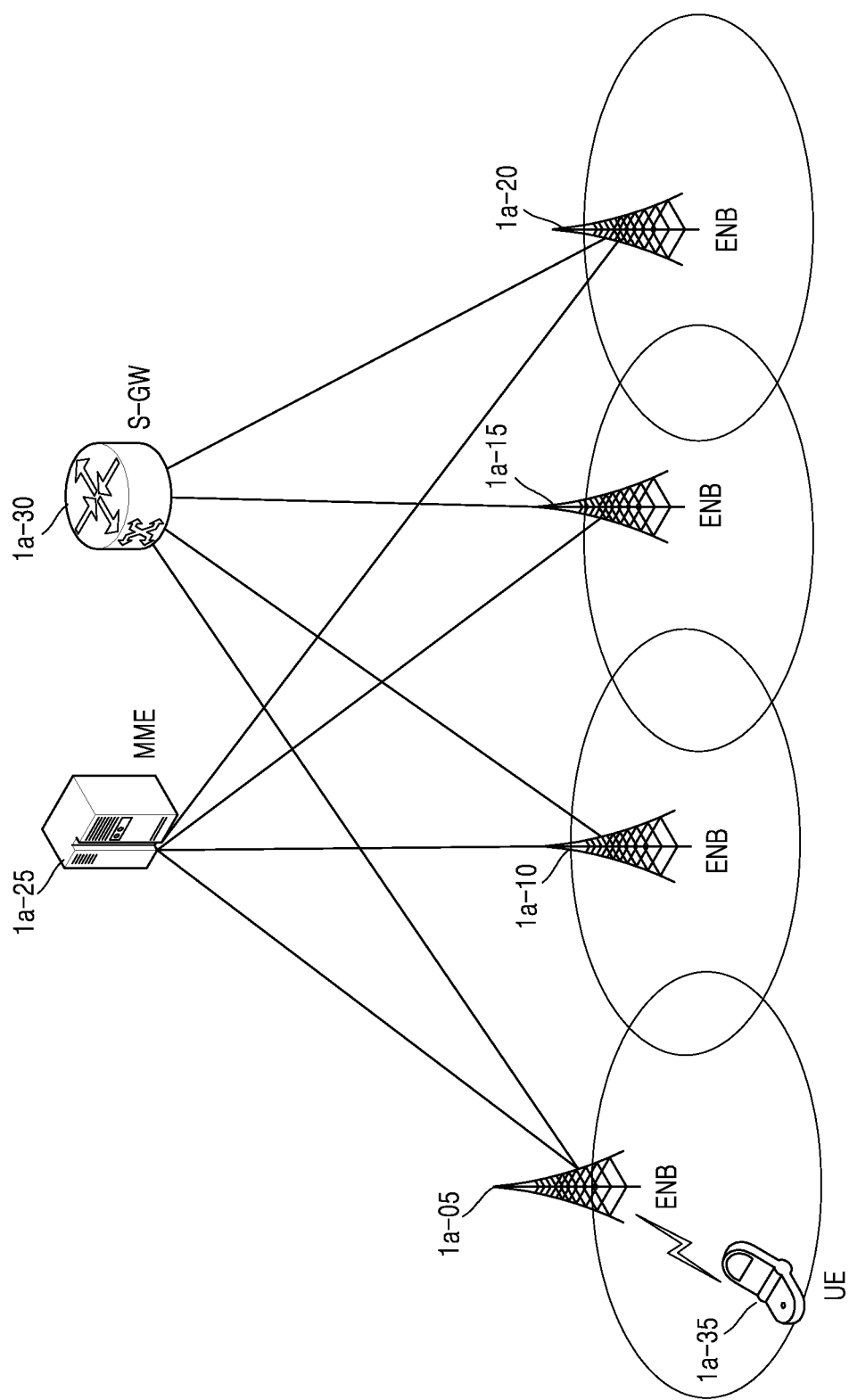
FIG. 1A is a diagram illustrating a structure of an LTE system according to some embodiments.

Hereinafter, embodiments of the disclosure will be described in detail with reference to the accompanying drawings. In the following description of the disclosure, detailed descriptions of well-known functions or configurations will be omitted because they would unnecessarily obscure the subject matters of the disclosure. Also, terms described below may be terms defined considering functions in the disclosure and may vary according to users' or operators' intentions or practices. Therefore, the definition thereof should be made based on the content throughout the specification.

Advantages and features of the disclosure and methods of achieving the same will be apparent from the embodiments of the disclosure described below in detail with reference to the accompanying drawings. The disclosure may, however, be embodied in many different forms and should not be construed as being limited to the embodiments of the disclosure described below; rather, these embodiments of the disclosure are provided to complete the disclosure and fully convey the scope of the disclosure to those of ordinary skill in the art and the disclosure will be defined only by the scope of the claims. Throughout the specification, like reference numerals may denote like elements.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-executable or computer-readable memory that may be directed to a computer or other programmable data processing equipment to implement a function in a particular manner, the instructions stored in the computer-executable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "~unit" used in the present embodiments may refer to a software component or a hardware component such as a field programmable gate array (FPGA) or an application specific integrated circuit (ASIC) and the "~unit" may perform certain functions. However, the "~unit" is not limited to software or hardware. The "~unit" may be configured to be in an addressable storage medium or may be configured to operate one or more processors. Thus, as an example, the "~unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~units" may be associated with the smaller number of components and "~units" or may be further divided into additional components and "~units". In addition, the components and "~units" may be implemented to operate one or more central processing units (CPUs) in a device or a security multimedia card. Also, in embodiments, the "~unit" may include one or more processors.

In the following description, terms for identifying access nodes, terms referring to network entities, terms referring to messages, terms referring to interfaces between network entities, terms referring to various identification information, and the like are used for convenience of description. Thus, the disclosure is not limited to the terms used below and other terms referring to objects having equivalent technical meanings may be used.

In the following description, terms and names defined in the $3^{rd}$ Generation Partnership Project Long Term Evolution (3GPP LTE) standards may be used for convenience of description. However, the disclosure is not limited to those terms and names and may be equally applied to systems according to other standards. In the disclosure, eNB may be used interchangeably with gNB for convenience of description. That is, a base station described as an eNB may represent a gNB. Also, the term "terminal" may refer to other wireless communication devices in addition to mobile phones, NB-IoT devices, and sensors.

Hereinafter, a base station may be an agent performing terminal resource allocation and may be at least one of a gNode B, an eNode B, a Node B, a base station (BS), a radio access unit, a base station controller, or a node on a network. Examples of the terminal may include a user equipment (UE), a mobile station (MS), a cellular phone, a smartphone, a computer, or a multimedia system capable of performing a communication function. However, the disclosure is not limited thereto.

Particularly, the disclosure is written based on the LTE system but may be applied to 3GPP NR (5G mobile communication standards) that is a next-generation mobile communication system. For example, in the disclosure, an eNB in LTE may correspond to a gNB in NR, and an MME in LTE may correspond to an AMF in NR. Also, the disclosure may be applied to intelligent services (e.g., smart home, smart building, smart city, smart car or connected car, health care, digital education, retail business, security, and safety-related services) based on 5G communication technology and IoT technology.

FIG. 1A is a diagram illustrating a structure of an LTE system according to some embodiments.

Referring to FIG. 1A, a radio access network of the LTE system may include next-generation base stations (e.g., evolved Node Bs (eNBs), Node Bs, or base stations) 1a-05, 1a-10, 1a-15, and 1a-20, a mobility management entity (MME) 1a-25, and a serving-gateway (S-GW) 1a-30. A user terminal (e.g., a user equipment (UE) or a terminal) 1a-35 may access an external network through the eNBs 1a-05 to 1a-20 and the S-GW 1a-30.

In FIG. 1A, the eNBs 1a-05 to 1a-20 may correspond to the existing Node Bs of a UMTS system. The eNB may be connected to the UE 1a-35 through a radio channel and may perform a more complex function than the existing Node B. In the LTE system, because all user traffic including real-time services such as Voice over IP (VoIP) through the Internet protocol is serviced through a shared channel, an apparatus for collecting and scheduling state information such as UEs' buffer states, available transmission power states, or channel states may be required, which may be managed by the eNBs 1a-05 to 1a-20. One eNB may generally control a plurality of cells. For example, in order to implement a transmission rate of 100 Mbps, the LTE system may use orthogonal frequency division multiplexing (OFDM) in a 20 MHz bandwidth as a radio access technology. Also, an adaptive modulation & coding (AMC) scheme may be applied to determine a modulation scheme and a channel coding rate according to the channel state of a terminal. The S-GW 1a-30 may be an apparatus for providing a data bearer and may generate or release a data bearer under the control by the MME 1a-25. The MME may be an apparatus for performing various control functions as well as a mobility management function for a terminal and may be connected to a plurality of base stations.

Figure 1B:
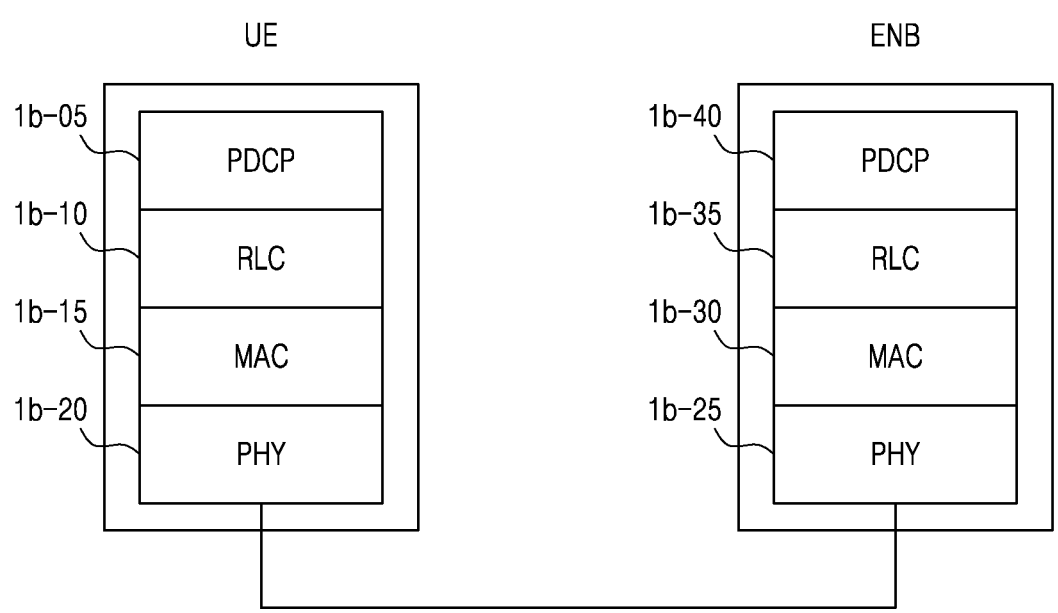
FIG. 1B is a diagram illustrating a radio protocol architecture in an LTE system according to some embodiments.

FIG. 1B is a diagram illustrating a radio protocol architecture in an LTE system according to some embodiments.

Referring to FIG. 1B, the radio protocol of the LTE system may include Packet Data Convergence Protocol (PDCP) 1b-05 and 1b-40, Radio Link Control (RLC) 1b-10 and 1b-35, and Medium Access Control (MAC) 1b-15 and 1b-30 in each of a terminal and an eNB. The PDCP 1b-05 and 1b-40 may perform operations such as Internet Protocol (IP) header compression/decompression, and the RLC 1b-10 and 1b-35 may reconstruct a PDCP packet data unit (PDU) in a suitable size to perform an ARQ operation or the like. The MAC 1b-15 and 1b-30 may be connected to several RLC entities configured in one terminal and may perform an operation of multiplexing RLC PDUs into MAC PDUs and demultiplexing RLC PDUs from MAC PDUs. Physical layers 1b-20 and 1b-25 may channel-code and modulate upper layer data, generate OFDM symbols, and transmit the same through radio channels or may demodulate and channel-decode OFDM symbols received through radio channels and transmit the result thereof to the upper layer.

Figure 1C:
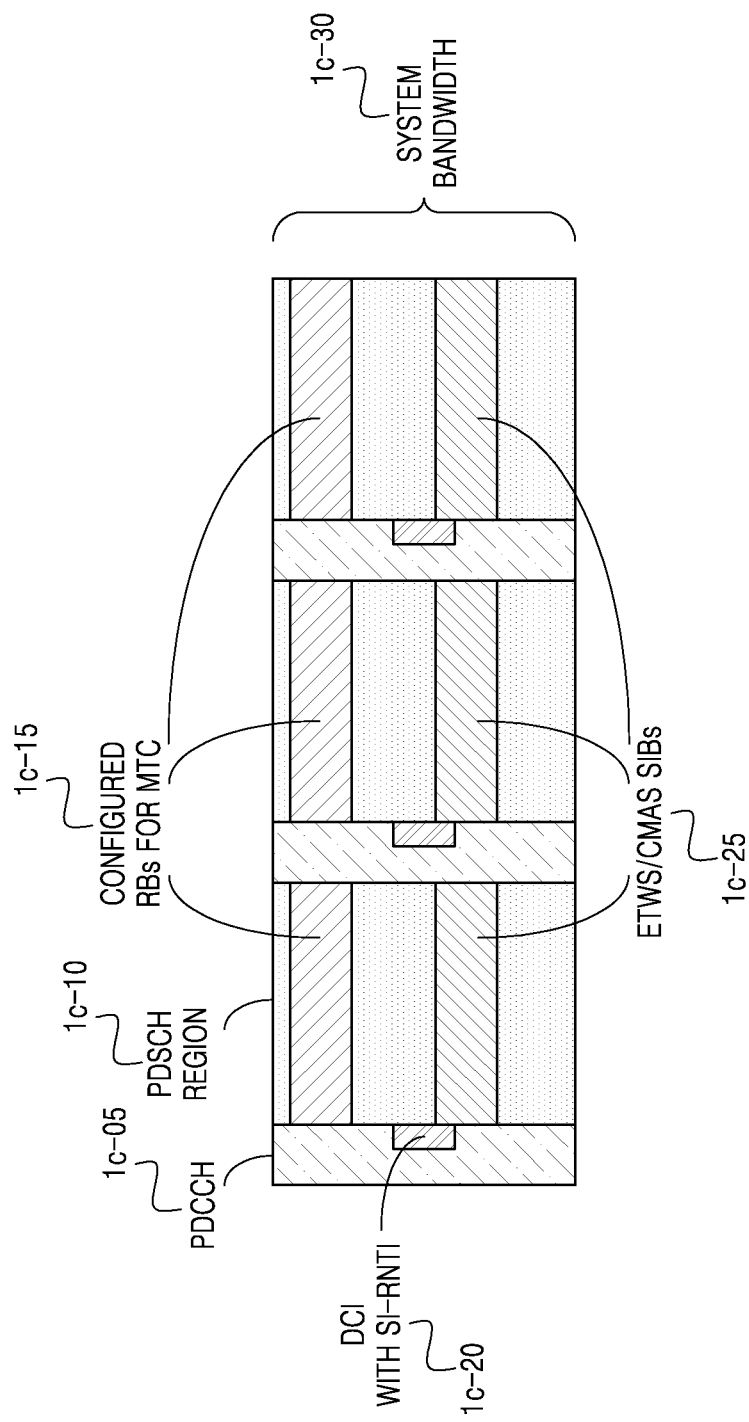
FIG. 1C is a diagram illustrating a narrowband configured for MTC and a bandwidth for broadcasting PWS information, according to some embodiments.

FIG. 1C is a diagram illustrating a narrowband configured for MTC and a bandwidth for broadcasting PWS information, according to some embodiments.

In the LTE, machine type communication (MTC) may be supported. Particularly, many MTC terminals may degrade in performance due to low unit cost and may be installed in areas where received signal strength is poor. Thus, in the LTE, in order to support low-performance MTC terminals, a narrow frequency bandwidth may be configured to the low-performance MTC terminals. For example, although a total system frequency bandwidth (system bandwidth) 1c-30 is 10 MHz, a low-performance MTC terminal may support only 6 physical resource blocks (PRBs). Thus, a base station may configure a narrow frequency bandwidth (narrowband) 1c-15 used by the low-performance MTC terminal. The low-performance MTC terminal may transmit and receive data only in the configured narrow frequency bandwidth. Also, in order to support the MTC terminals in areas where received signal strength is poor, a repetitive transmission technique may be applied. All the transmission/reception information may be repeatedly transmitted a configured number of times, and the terminal or the base station may secure energy required for decoding by soft-combining the repeatedly received information. When the MTC terminal transmits and receives data through the repetitive transmission technique, the MTC terminal may be referred to as being in a coverage extension (CE) mode and the CE mode may be divided into CE mode 0 (no coverage extension), CE mode 1, CE mode 2, and CE mode 3 according to the required number of repeated transmissions. The CE mode may be performed only in the configured narrow frequency bandwidth. The MTC terminal may report to the base station whether it supports the CE mode.

Because a normal terminal (i.e., a terminal other than the above low-performance MTC terminal) may also be in an area where received signal strength is poor, there may be a normal terminal supporting the CE mode. The normal terminal may support an operation in the system frequency bandwidth but may perform a data transmission/reception operation only in the configured narrow frequency bandwidth when access is triggered in the CE mode.

The normal terminal may receive both PDCCH 1c-05 and PDSCH 1c-10 transmitted in the system frequency bandwidth. Because the above low-cost MTC terminal may not receive the system frequency bandwidth, it may not receive the existing PDCCH. Instead, control information may be provided through the MPDCCH transmitted in the narrowband of the PDSCH.

On the other hand, the base station may broadcast public warning system (PWS) information such as earthquake & tsunami warning system (ETWS) or commercial mobile alert system (CMAS) at the position of a particular radio resource of the system frequency bandwidth. The PWS information may include disaster information such as earthquake and tsunami warning. The PWS information may be broadcast in SIB10, SIB11, or SIB12 as system information 1c-25. The base station may notify the terminal that system information related to the PWS information is being broadcast, through a certain indicator of a paging message. Upon receiving the paging message including the indicator, the terminal may read SIB1 and may obtain scheduling information of the system information related to the PWS included in the SIB1. The scheduling information may include time scheduling information of PWS system information, and frequency scheduling information of the PWS system information may be provided in DCI 1c-20 indicated in SI-RNTI of the PDCCH. Also, the terminal may obtain the system information related to the PWS according to the scheduling information. In general, when the base station configures a narrowband to support an MTC terminal or a normal terminal supporting the CE mode, the base station may separate the configured narrowband from the radio resource through which the system information related to the PWS is broadcast.

An MTC terminal operating in a narrow frequency bandwidth or a normal terminal operating in a CE mode may not need to monitor and receive a paging message in a connected mode (RRC_Connected). This may be because transmitting the paging message in the configured narrow frequency bandwidth may further reduce insufficient radio resources and the low-cost MTC terminals may have to consume a lot of time and power to receive the paging message. When the paging message should be monitored in other frequency bands, the low-cost MTC terminals may have to perform a repetitive frequency band switching operation.

Figure 1D:
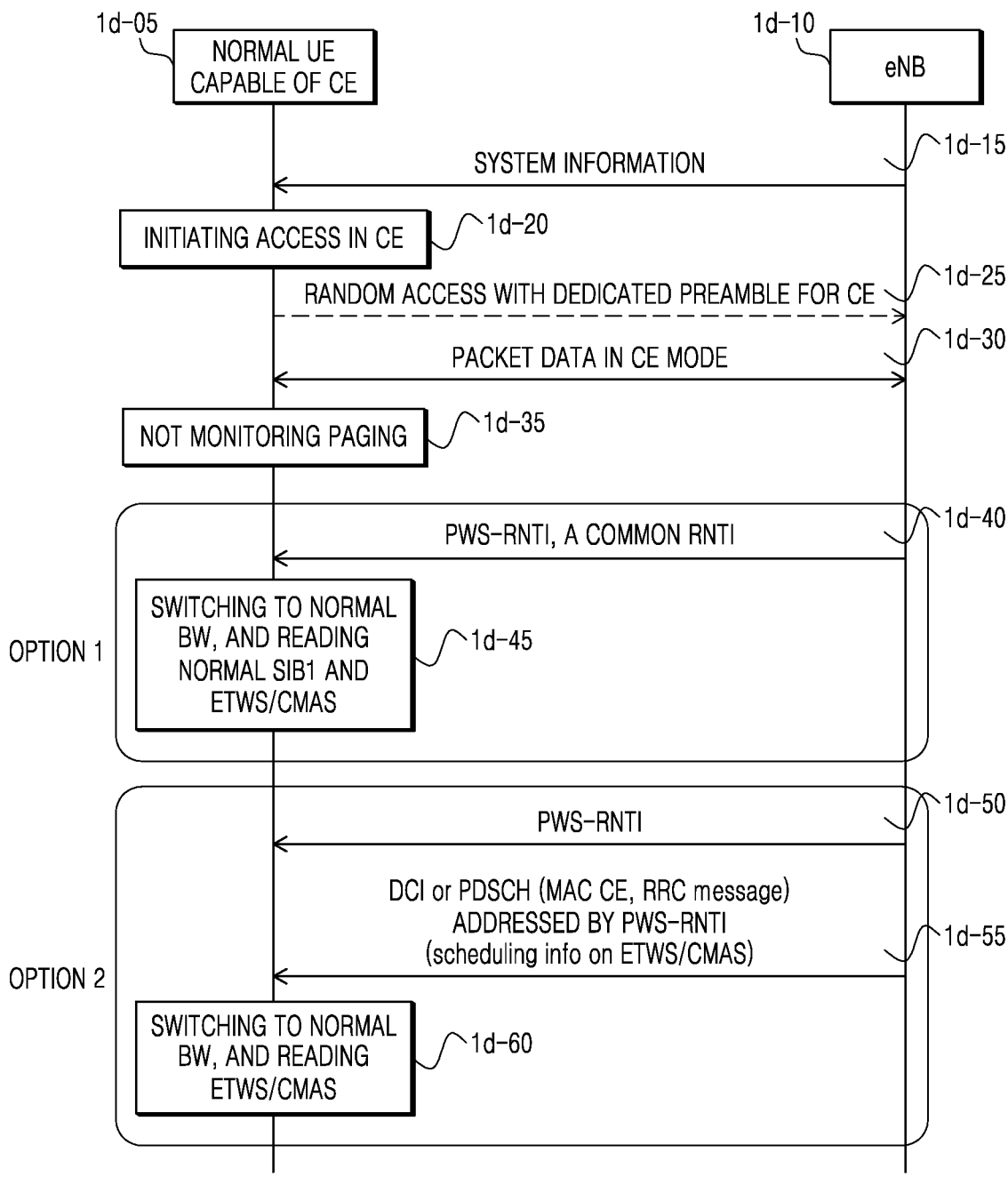
FIG. 1D is a flowchart illustrating a process in which a terminal receives PWS information, according to some embodiments.

FIG. 1D is a flowchart illustrating a process in which a terminal receives PWS information, according to some embodiments.

MTC terminals may not need to receive PWS information such as meters and sensors. On the other hand, a normal terminal in the CE mode may be a terminal directly used by the user. Thus, a normal terminal supporting the CE mode may need to receive PWS information while operating in the CE mode. However, because terminals operating in a narrowband may not monitor a paging message when necessary, they may not know that PWS information is being broadcast.

Thus, a method of providing PWS information to a normal terminal performing the CE mode may be required. A method of providing PWS information to a normal terminal performing the CE mode according to an embodiment may be a method of providing PWS information to the terminal by using dedicated signaling in the narrowband used by the normal terminal performing the CE mode or broadcasting copy information of PWS-related SIB in the narrowband. However, because this method uses a radio resource in the narrowband, an MTC terminal not requiring the PWS information may be deprived of an effective radio resource. Thus, in the disclosure, according to an embodiment, it is proposed that the base station should transmit, in the narrowband, an indicator indicating that PWS-related SIBs are being broadcast in the system frequency bandwidth. Because the normal terminal performing the CE mode also supports an operation in the existing system frequency bandwidth, the base station may obtain an indicator indicating that PWS-related SIBs are being broadcast in the system frequency bandwidth and simultaneously may receive the PWS-related SIBs broadcast in the system frequency bandwidth.

A normal terminal 1d-05 supporting the CE mode may receive system information broadcast from a base station 1d-10 (1d-15). The system information received by the normal terminal 1d-05 may include parameters (or information) required for the base station to support the MTC terminal or the CE mode. For example, the parameters (or information) included in the system information may include narrowband hopping information of the base station, random access configuration information used in the CE mode, scheduling information of the system information broadcast in the narrowband, or the like.

The normal terminal 1d-05 supporting the CE mode may determine to trigger access in the CE mode because the current channel quality is poor (1d-20). The normal terminal 1d-05 supporting the CE mode may transmit a preamble to the base station 1d-10 in a configured radio resource by using a dedicated preamble allocated to the CE mode (1d-25). The normal terminal 1d-05 may repeatedly transmit and receive data in the CE mode (1d-30). The normal terminal 1d-05 may not monitor a paging message (1d-35).

The normal terminal 1d-05 supporting the CE mode may receive a new PWS-RNTI in the MPDCCH transmitted in the narrowband configured from the base station 1d-10 (1d-40). The PWS-RNTI may indicate that PWS-related system information is being broadcast in the current system frequency bandwidth.

Alternatively, an indicator indicating that PWS-related system information is being broadcast in the current system frequency bandwidth may be included in the DCI corresponding to the SI-RNTI transmitted in the configured narrowband.

Through the above methods, the normal terminal 1d-05 determining that PWS-related system information is being broadcast in the current system frequency bandwidth may receive the SIB1 broadcast in the system frequency bandwidth. The normal terminal 1d-05 may obtain scheduling information of system information related to the PWS included in the SIB1 and may sequentially obtain system information related to the PWS according to the scheduling information (1d-45).

According to other embodiments, the base station 1d-10 may store scheduling information of PWS-related system information in DCI, a MAC CE, or an RRC message corresponding to a PWS-RNTI 1d-50 and transmit the same to the normal terminal 1d-05 (1d-55). The normal terminal 1d-05 having received the MAC CE or the RRC message may obtain PWS-related system information by using the scheduling information included in the MAC CE or the RRC message without receiving the SIB1 (1d-60). The DCI may be obtained from the MPDCCH that has decoded the PWS-RNTI. The MAC CE or the RRC message may be in the narrowband that has decoded the PWS-RNTI or may be in other frequency bands. Scheduling information of the MAC CE or the RRC message may be included in the DCI corresponding to the PWS-RNTI.

Scheduling information of the PWS-related system information (e.g., SIB10, 11, 12) included in the above DCI, MAC CE, and RRC message may be schedulingInfoList IE or scheduling information included in the existing SIB1. However, because the amount of information of the schedulingInfoList IE is relatively large, it may be inefficient for it to be included in the DCI, MAC CE, or RRC message. Thus, more optimized information may be required. In the disclosure, it is proposed to provide frame and subframe information in which PWS-related system information is transmitted, based on the time point at which the PWS-RNTI is received (based on a frame or a subframe). For example, when the PWS-RNTI is transmitted in the p-th subframe in the n-th frame, the base station may signal frame information "k" and subframe information "q". Additionally, period information may also be included. This may mean that the PWS-related system information is transmitted in the (n+k)th frame and the (p+q)th subframe (or the q-th subframe). Because a plurality of pieces of PWS-related system information may be broadcast, the number of sets of the information may match the number of pieces of the broadcast PWS-related system information.

Figure 1E:
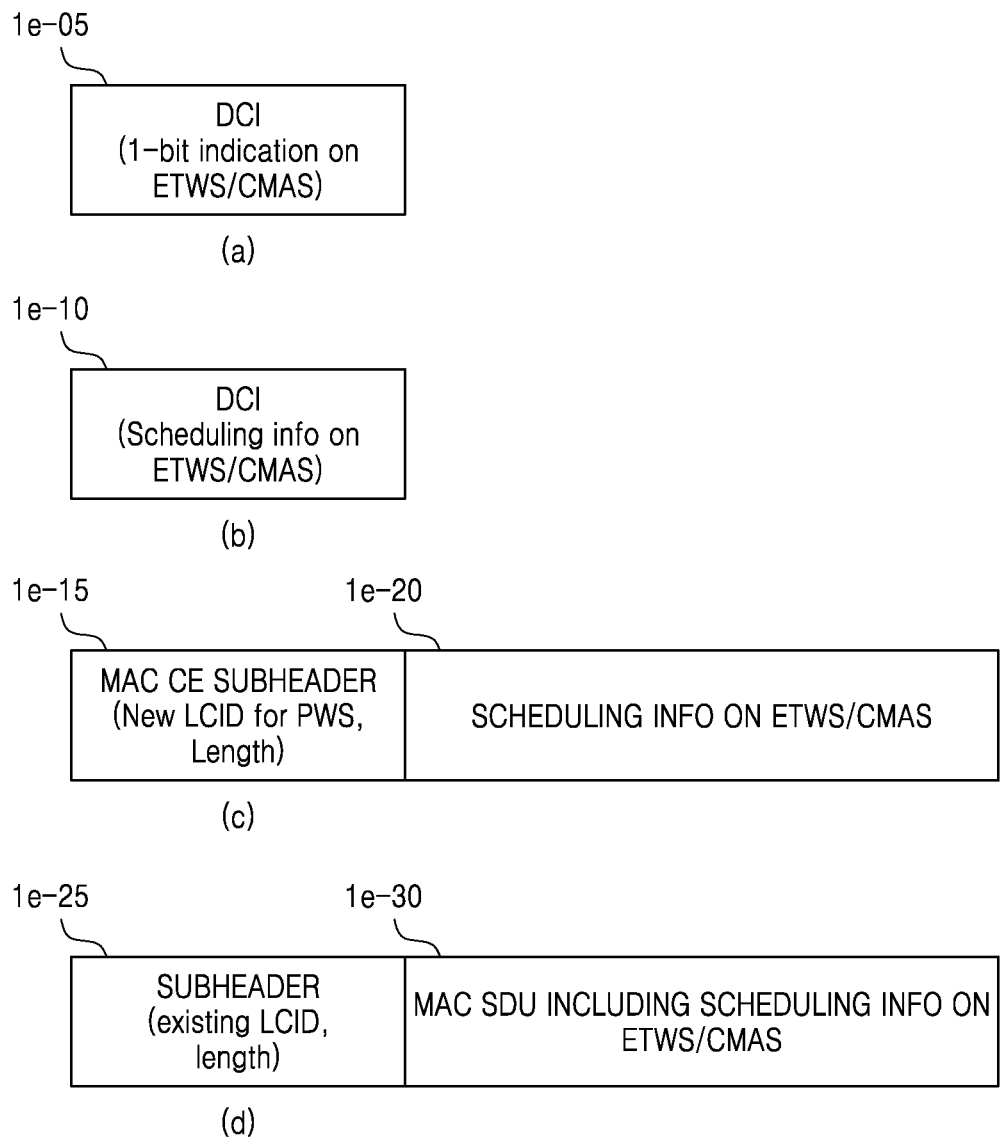
FIG. 1E is a diagram illustrating a structure of a message indicating that PWS information is being broadcast, according to some embodiments.

FIG. 1E is a diagram illustrating a structure of a message indicating that PWS information is being broadcast, according to some embodiments.

There may be various embodiments of the structure of a message indicating that PWS information is being broadcast, and the present embodiments are not limited thereto.

An indicator indicating that PWS-related system information is being broadcast in a system frequency band may be included in the DCI corresponding to the PWS-RNTI described above (1e-05).

Scheduling information of PWS-related system information broadcast in a system frequency band may be included in the DCI corresponding to the PWS-RNTI described above (1e-10).

The DCI corresponding to the PWS-RNTI described above may include PDSCH scheduling information, and a MAC CE may be transmitted in a radio resource corresponding to the PDSCH scheduling information. A subheader 1e-15 of the MAC CE may include a new LCID indicating the MAC CE including scheduling information of PWS-related system information and may include length information of the MAC CE. The scheduling information of the PWS-related system information may be included in the MAC CE (1e-20).

The DCI corresponding to the PWS-RNTI described above may include PDSCH scheduling information, and a MAC SDU including an RRC message may be transmitted in a radio resource corresponding to the PDSCH scheduling information. A subheader 1e-25 of the MAC SDU may include an LCD indicating the MAC SDU and may include length information of the MAC SDU. Scheduling information of PWS-related system information may be included in the RRC message (1e-30).

Figure 1F:
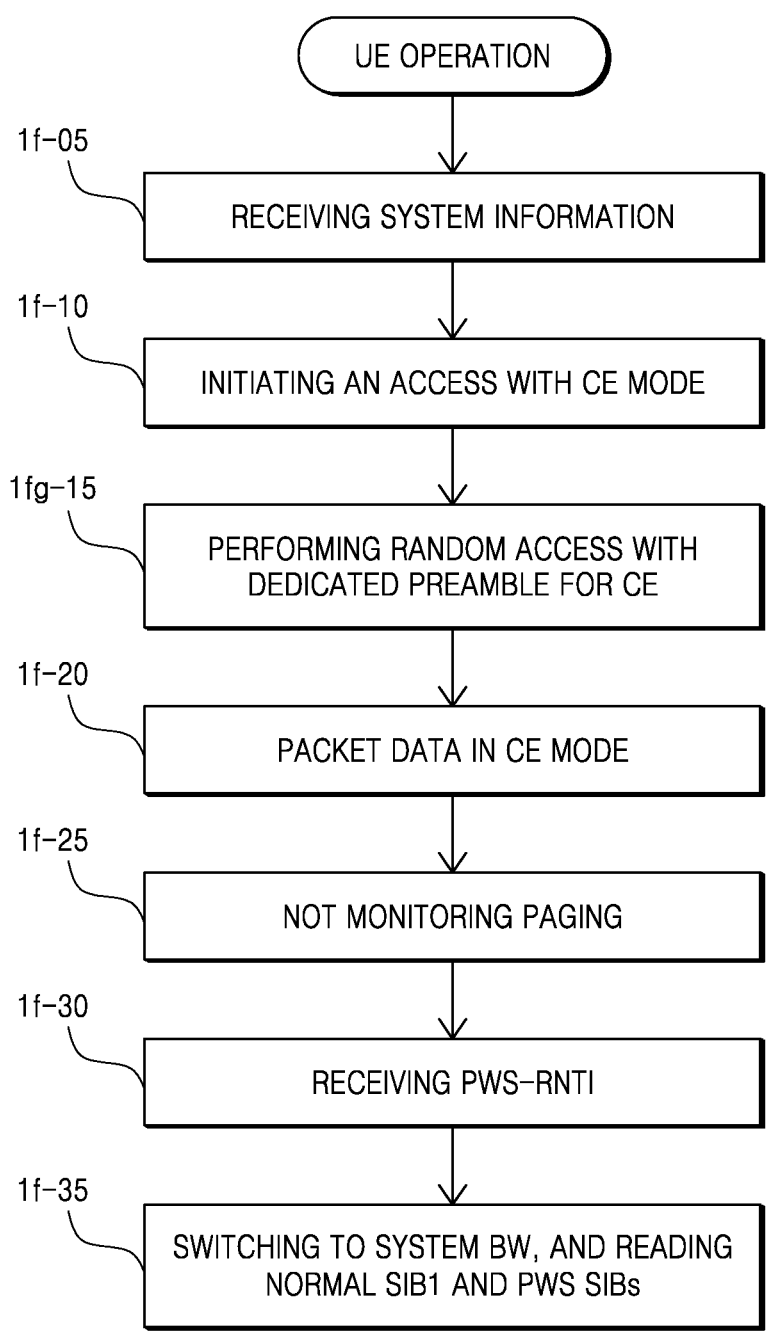
FIG. 1F is a flowchart illustrating an operation of a terminal according to some embodiments.

FIG. 1F is a flowchart illustrating an operation of a terminal according to some embodiments.

In operation 1f-05, the terminal may receive system information from the base station. The terminal may be a normal terminal supporting the CE mode and may support a data transmission/reception operation in the system frequency bandwidth provided by the base station but may trigger access in the CE mode when the channel quality is poor. The system information broadcast by the base station may include configuration information necessary for the terminal to perform access in the CE mode.

In operation 1*f*-10, the terminal may initiate access in the CE mode.

In operation 1*f*-15, the terminal may perform a random access process by using a random access (RA) radio resource and a dedicated preamble allocated for a CE mode operation.

In operation 1*f*-20, the terminal may perform data transmission/reception in the narrowband configured in the CE mode.

In operation 1*f*-25, the terminal may not perform paging monitoring because it is operating in the CE mode.

In operation 1*f*-30, the terminal may receive the PWS-RNTI from the base station in the configured narrowband.

In operation 1*f*-35, the terminal may deviate from the narrowband and receive the conventional SIB1. The terminal may obtain scheduling information of the system information related to the PWS included in the SIB1 and may sequentially obtain the system information related to the PWS according to the scheduling information.

Figure 1G:
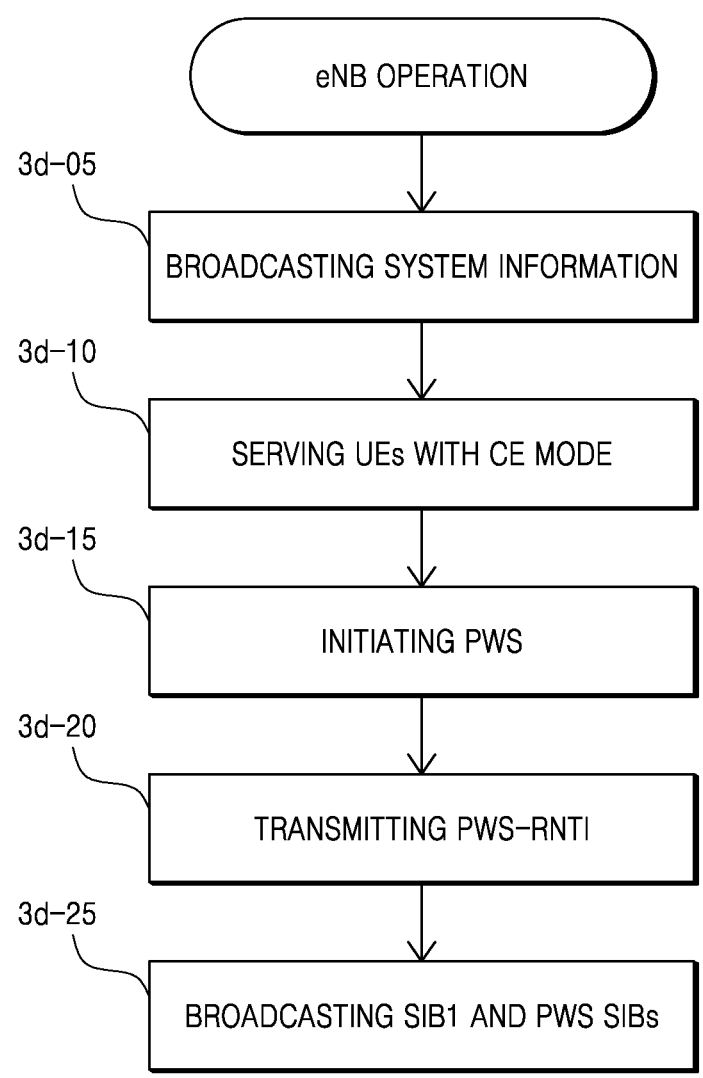
FIG. 1G is a flowchart illustrating an operation of a base station according to some embodiments.

FIG. 1G is a flowchart illustrating an operation of a base station according to some embodiments.

In operation 1*g*-05, the base station may broadcast system information including configuration information related to the CE mode.

In operation 1*g*-10, the base station may support the CE mode for a particular terminal that has performed random access through a RA radio resource and a dedicated preamble allocated for the CE mode. The base station may configure one narrowband to the terminal. Through the narrowband, the base station may transmit/receive data to/from the terminal.

In operation 1*g*-15, the base station may initiate an operation of broadcasting disaster information (ETWS or CMAS).

In operation 1*g*-20, the base station may transmit the PWS-RNTI on the MPDCCH of the configured narrowband.

In operation 1*g*-25, the base station may update the SIB1 to include scheduling information of system information including the disaster information and may broadcast the system information including the disaster information.

Figure 1H:
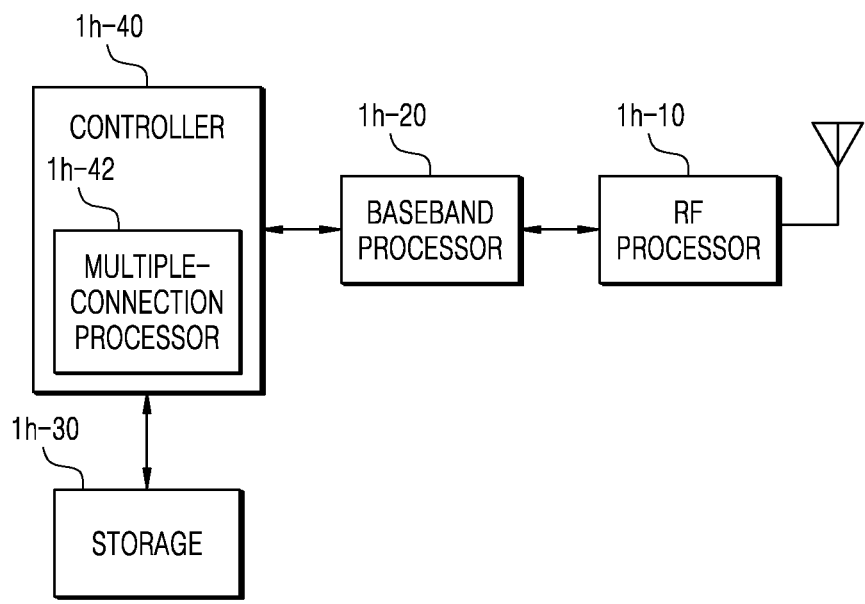
FIG. 1H is a block diagram illustrating a structure of a terminal according to some embodiments.

FIG. 1H is a block diagram illustrating a structure of a terminal according to some embodiments.

Referring to FIG. 1H, the terminal may include a radio frequency (RF) processor 1*h*-10, a baseband processor 1*h*-20, a storage 1*h*-30, and a controller 1*h*-40.

The RF processor 1*h*-10 may perform functions for transmitting/receiving signals through radio channels, such as band conversion and amplification of signals. That is, the RF processor 1*h*-10 may up-convert a baseband signal provided from the baseband processor 1*h*-20 into an RF band signal and transmit the same through an antenna and may down-convert an RF band signal received through the antenna into a baseband signal. For example, the RF processor 1*h*-10 may include a transmission filter, a reception filter, an amplifier, a mixer, an oscillator, a digital-to-analog converter (DAC), and an analog-to-digital converter (ADC). Although only one antenna is illustrated in the drawings, the terminal may include a plurality of antennas. Also, the RF processor 1*h*-10 may include a plurality of RF chains. In addition, the RF processor 1*h*-10 may perform beamforming. For beamforming, the RF processor 1*h*-10 may adjust the phase and magnitude of each of the signals transmitted/received through a plurality of antennas or antenna elements. Also, the RF processor may perform multiple-input and multiple-output (MIMO) and may receive multiple layers when performing a MIMO operation.

The baseband processor 1*h*-20 may perform a conversion function between a baseband signal and a bit string according to the physical layer standard of the system. For example, during data transmission, the baseband processor 1*h*-20 may generate complex symbols by encoding and modulating a transmission bit string. Also, during data reception, the baseband processor 1*h*-20 may restore a reception bit string by demodulating and decoding the baseband signal provided from the RF processor 1*h*-10. For example, according to an OFDM scheme, during data transmission, the baseband processor 1*h*-20 may generate complex symbols by encoding and modulating a transmission bit string, map the complex symbols to subcarriers, and then configure OFDM symbols through an inverse fast Fourier transform (IFFT) operation and cyclic prefix (CP) insertion. Also, during data reception, the baseband processor 1*h*-20 may divide a baseband signal provided from the RF processor 1*h*-10 into OFDM symbol units, restore signals mapped to the subcarriers through a fast Fourier transform (FFT) operation, and then restore a reception bit string through demodulation and decoding.

The baseband processor 1*h*-20 and the RF processor 1*h*-10 may transmit and receive signals as described above. Accordingly, the baseband processor 1*h*-20 and the RF processor 1*h*-10 may be referred to as a transmitter, a receiver, a transceiver, or a communicator. In addition, at least one of the baseband processor 1*h*-20 and the RF processor 1*h*-10 may include a plurality of communication modules to support a plurality of different radio access technologies. Also, at least one of the baseband processor 1*h*-20 and the RF processor 1*h*-10 may include a plurality of communication modules to process signals of different frequency bands. For example, the different radio access technologies may include wireless LAN (e.g., IEEE 802.11) and cellular network (e.g., LTE). Also, the different frequency bands may include a super high frequency (SHF) (e.g., 2.5 GHz or 5 GHz) band and a millimeter wave (e.g., 60 GHz) band.

The storage 1*h*-30 may store data such as a basic program, an application program, or configuration information for an operation of the terminal. Particularly, the storage 1*h*-30 may store information related to a second access node performing wireless communication by using a second radio access technology. Also, the storage 1*h*-30 may provide the stored data at the request of the controller 1*h*-40.

The controller 1*h*-40 may control overall operations of the terminal. For example, the controller 1*h*-40 may transmit/receive signals through the baseband processor 1*h*-20 and the RF processor 1*h*-10. Also, the controller 1*h*-40 may write/read data into/from the storage 1*h*-30. For this purpose, the controller 1*h*-40 may include at least one processor. For example, the controller 1*h*-40 may include a communication processor (CP) for performing control for communication and an application processor (AP) for controlling an upper layer such as an application program.

The controller 1*h*-40 may control a series of processes such that the terminal may operate according to the above embodiments. According to some embodiments, the controller 1*h*-40 may control the components of the terminal to receive, from the base station, system information including configuration information necessary for the terminal to perform access in the CE mode, and to initiate access in the CE mode. Also, the controller 1*h*-40 may control the components of the terminal to perform a random access process by using a random access (RA) radio resource and a dedicated preamble allocated for a CE mode operation, to perform data transmission/reception in the narrowband configured in the CE mode, and to receive the PWS-RNTI from the base station in the configured narrowband. Also, the controller 1h-40 may control the components of the terminal to deviate from the narrowband and receive the conventional SIB1, to obtain scheduling information of the system information related to the PWS included in the SIB1, and to sequentially obtain the system information related to the PWS according to the scheduling information.

Figure 1I:
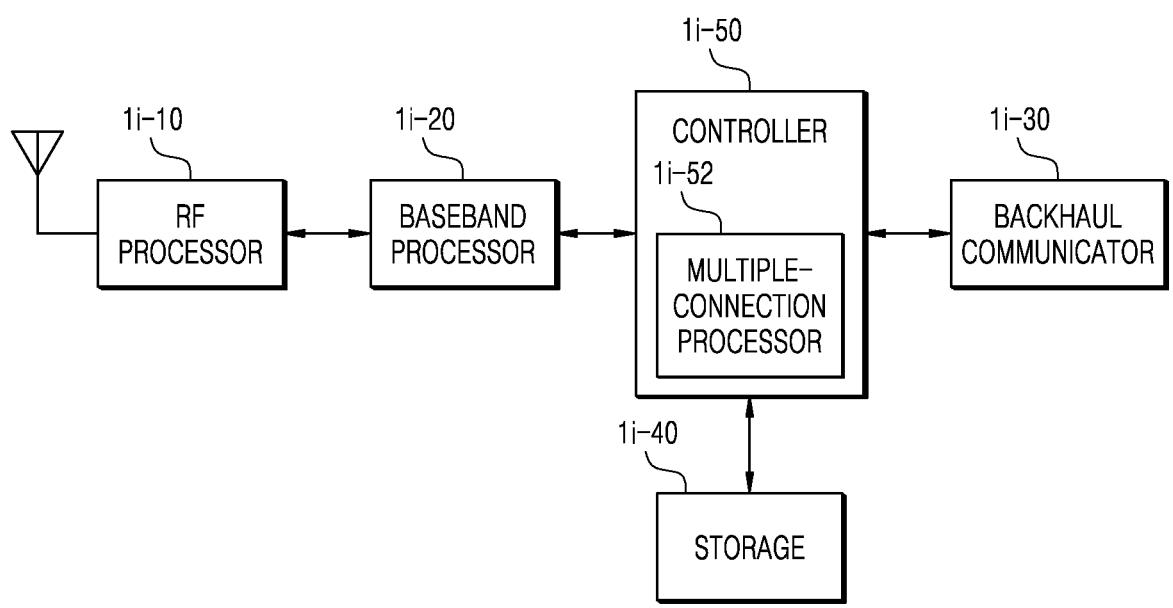
FIG. 1I is a block diagram illustrating a structure of a base station according to some embodiments.

FIG. 1I is a block diagram illustrating a structure of a base station according to some embodiments.

As illustrated in FIG. 1I, the base station may include an RF processor 1i-10, a baseband processor 1i-20, a backhaul communicator 1i-30, a storage 1i-40, and a controller 1i-50.

The RF processor 1i-10 may perform functions for transmitting/receiving signals through wireless channels, such as band conversion and amplification of signals. That is, the RF processor 1i-10 may up-convert a baseband signal provided from the baseband processor 1i-20 into an RF band signal and transmit the same through an antenna and may down-convert an RF band signal received through the antenna into a baseband signal. For example, the RF processor 1i-10 may include a transmission filter, a reception filter, an amplifier, a mixer, an oscillator, a DAC, and an ADC. Although only one antenna is illustrated in the drawings, a first access node may include a plurality of antennas. Also, the RF processor 1i-10 may include a plurality of RF chains. In addition, the RF processor 1i-10 may perform beamforming. For beamforming, the RF processor 1i-10 may adjust the phase and magnitude of each of the signals transmitted/received through a plurality of antennas or antenna elements. The RF processor may perform a downlink MIMO operation by transmitting one or more layers.

The baseband processor 1i-20 may perform a conversion function between a baseband signal and a bit string according to the physical layer standard of a first radio access technology. For example, during data transmission, the baseband processor 1i-20 may generate complex symbols by encoding and modulating a transmission bit string. Also, during data reception, the baseband processor 1i-20 may restore a reception bit string by demodulating and decoding the baseband signal provided from the RF processor 1i-10. For example, according to the OFDM scheme, during data transmission, the baseband processor 1i-20 may generate complex symbols by encoding and modulating a transmission bit string, map the complex symbols to subcarriers, and then configure OFDM symbols through an IFFT operation and CP insertion. Also, during data reception, the baseband processor 1i-20 may divide a baseband signal provided from the RF processor 1i-10 into OFDM symbol units, restore signals mapped to the subcarriers through an FFT operation, and then restore a reception bit string through demodulation and decoding. The baseband processor 1i-20 and the RF processor 1i-10 may transmit and receive signals as described above. Accordingly, the baseband processor 1i-20 and the RF processor 1i-10 may be referred to as a transmitter, a receiver, a transceiver, a communicator, or a wireless communicator.

The backhaul communicator 1i-30 may provide an interface for communicating with other nodes in the network. That is, the backhaul communicator 1i-30 may convert a bit string transmitted from the base station to another node, for example, an auxiliary base station, a core network, or the like, into a physical signal and may convert a physical signal received from another node into a bit string.

The storage 1i-40 may store data such as a basic program, an application program, or configuration information for an operation of the base station. Particularly, the storage 1i-40 may store information about a bearer allocated to a connected terminal, a measurement result reported from the connected terminal, or the like. Also, the storage 1i-40 may store information that is a reference for determining whether to provide or terminate a multiple connection to the terminal. Also, the storage 1i-40 may provide the stored data at the request of the controller 1i-50.

The controller 1i-50 may controls overall operations of the base station. For example, the controller 1i-50 may transmit/receive signals through the baseband processor 1i-20 and the RF processor 1i-10 or through the backhaul communicator 1i-30. Also, the controller 1i-50 may write/read data into/from the storage 1i-40. For this purpose, the controller 1i-50 may include at least one processor.

The controller 1i-50 may control a series of processes such that the base station may operate according to the above embodiments. According to some embodiments, the controller 1i-50 may control the components of the base station to broadcast system information including configuration information related to the CE mode, to support the CE mode for a particular terminal that has performed random access through a RA radio resource and a dedicated preamble allocated for the CE mode, and to configure one narrowband to the terminal. Also, the controller 1i-50 may control the components of the base station to initiate an operation of broadcasting disaster information (ETWS or CMAS), to transmit the PWS-RNTI on the MPDCCH of the configured narrowband, to update scheduling information of system information including the disaster information, and to broadcast the system information including the disaster information.

Figure 2A:
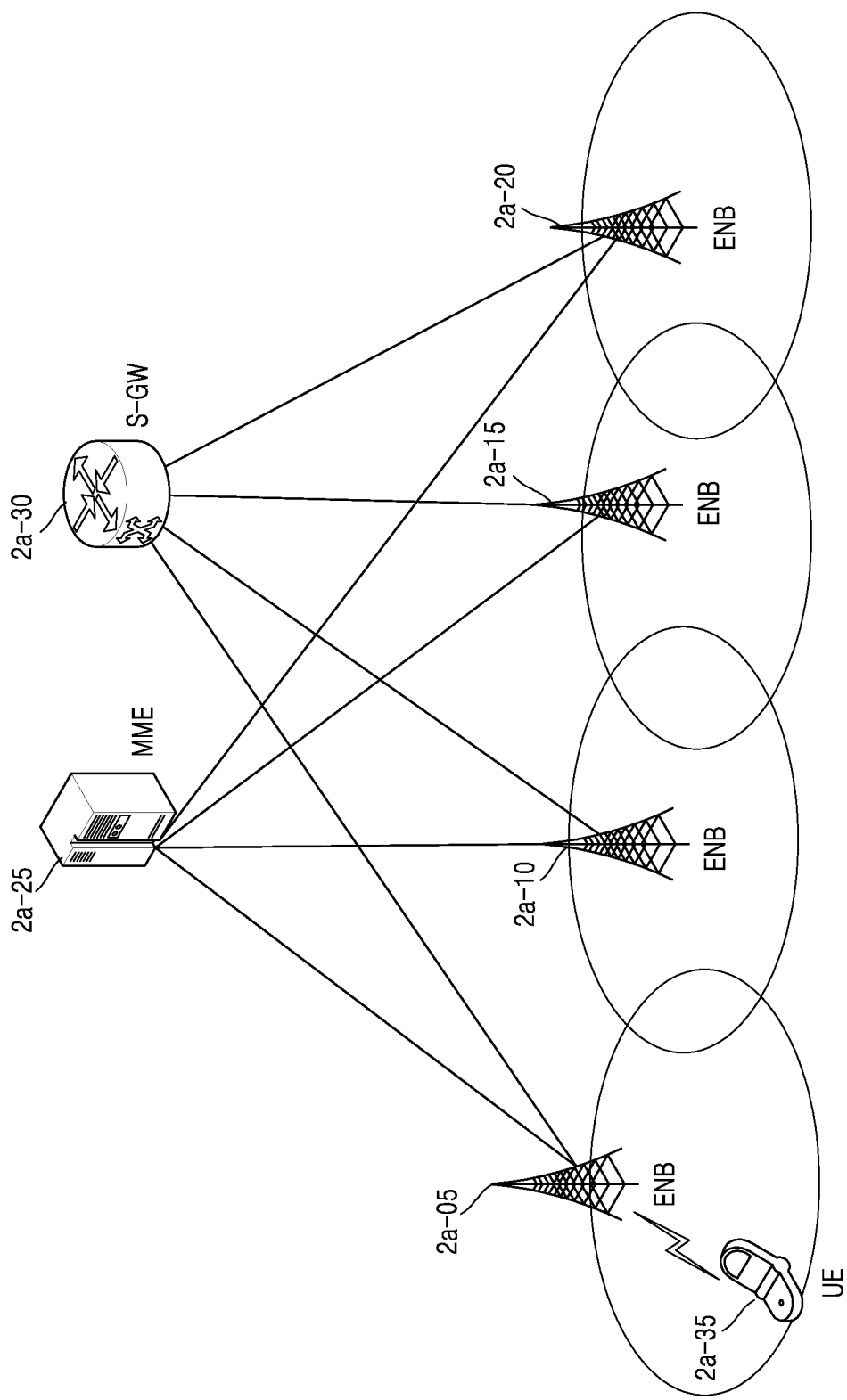
FIG. 2A is a diagram illustrating a structure of an LTE system according to some embodiments.

FIG. 2A is a diagram illustrating a structure of an LTE system according to some embodiments.

Referring to FIG. 2A, a radio access network of the LTE system may include next-generation base stations (e.g., evolved Node Bs (eNBs), Node Bs, or base stations) 2a-05, 2a-10, 2a-15, and 2a-20, a mobility management entity (MME) 2a-25, and a serving-gateway (S-GW) 2a-30. A user terminal (e.g., a user equipment (UE) or a terminal) 2a-35 may access an external network through the eNBs 2a-05 to 2a-20 and the S-GW 2a-30.

In FIG. 2A, the eNBs 2a-05 to 2a-20 may correspond to the existing Node Bs of a UMTS system. The eNB may be connected to the UE 2a-35 through a radio channel and may perform a more complex function than the existing Node B. In the LTE system, because all user traffic including real-time services such as Voice over IP (VoIP) through the Internet protocol is serviced through a shared channel, an apparatus for collecting and scheduling state information such as UEs' buffer states, available transmission power states, or channel states may be required, which may be managed by the eNBs 2a-05 to 2a-20. One eNB may generally control a plurality of cells. For example, in order to implement a transmission rate of 100 Mbps, the LTE system may use orthogonal frequency division multiplexing (OFDM) in a 20 MHz bandwidth as a radio access technology. Also, an adaptive modulation & coding (AMC) scheme may be applied to determine a modulation scheme and a channel coding rate according to the channel state of a terminal. The S-GW 2a-30 may be an apparatus for providing a data bearer and may generate or remove a data bearer under the control by the MME 2a-25. The MME may be an apparatus for performing various control functions as well as a mobility management function for a terminal and may be connected to a plurality of base stations.

Figure 2B:
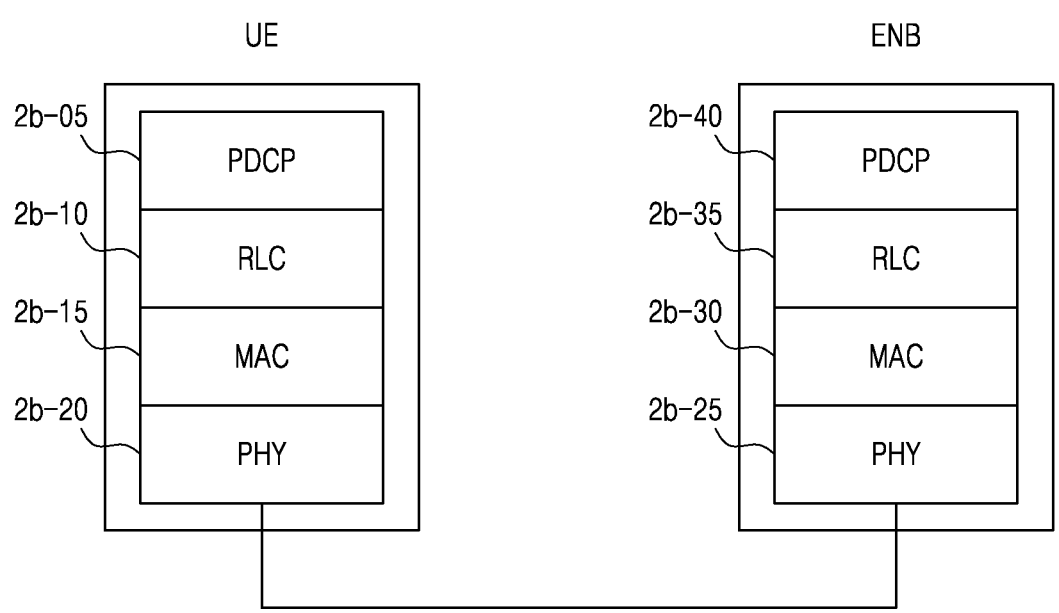
FIG. 2B is a diagram illustrating a radio protocol architecture in an LTE system according to some embodiments.

FIG. 2B is a diagram illustrating a radio protocol architecture in an LTE system according to some embodiments.

Referring to FIG. 2B, the radio protocol of the LTE system may include Packet Data Convergence Protocol (PDCP) 2b-05 and 2b-40, Radio Link Control (RLC) 2b-10 and 2b-35, and Medium Access Control (MAC) 2b-15 and 2b-30 in each of a terminal and an eNB. The PDCP 2b-05 and 2b-40 may perform operations such as Internet Protocol (IP) header compression/decompression, and the RLC 2b-10 and 2b-35 may reconstruct a PDCP packet data unit (PDU) in a suitable size to perform an ARQ operation or the like. The MAC 2b-15 and 2b-30 may be connected to several RLC entities configured in one terminal and may perform an operation of multiplexing RLC PDUs into MAC PDUs and demultiplexing RLC PDUs from MAC PDUs. Physical layers 2b-20 and 2b-25 may channel-code and modulate upper layer data, generate OFDM symbols, and transmit the same through radio channels or may demodulate and channel-decode OFDM symbols received through radio channels and transmit the result thereof to the upper layer.

Wireless devices belonging to Machine Type Communication (MTC) or Internet of Things (IoT) may need to exchange (transmit/receive) very small user data with each other. Research has been conducted on early data transmission (EDT) as a technology for transmitting/receiving, by a terminal, small user data in a paging or random access process with a base station without switching from an idle mode (RRC_Idle) or an inactive mode (RRC_Inactive) to a connected mode (RRC_connected) in a mobile communication system. Particularly, an option in which a base station transmits msg4 including user data transmitted to a terminal (Mobile Terminated-initiated, MT-initiated) has also been introduced. In successfully transmitting an msg4 message, the success probability thereof may be improved when the downlink channel quality state is known before transmitting the message. For example, when the downlink channel quality is not good, more radio resources may be allocated and more redundancy bits may be added to transmit the msg4 message. The disclosure may be intended to provide a method of reporting, by the terminal, downlink channel quality information to the base station through an msg3 message before transmission of the msg4 message. Particularly, a new MAC CE including channel quality information may be defined in the msg3 message. However, in the disclosure, an operation of reporting, by the terminal, the downlink channel quality information to the base station through the msg3 message is not limited to an EDT operation.

FIG. 2C is a flowchart illustrating a process of reporting downlink channel quality information through msg3, according to some embodiments.

According to an embodiment, a terminal 2c-05 may receive system information broadcast from a base station 2c-10 (2c-15). The system information may include an indicator indicating that the base station 2c-10 has the capability to receive downlink channel quality information through msg3. Also, the system information may include a dedicated preamble for an operation of reporting downlink channel quality information. The terminal 2c-05 may trigger an EDT operation (2c-20). The terminal 2c-05 may transmit a preamble to the base station 2c-10 (2c-25). The base station 2c-10 may transmit a random access response (RAR) to the terminal 2c-05 (2c-30). The RAR may include an indicator for requesting to report downlink channel quality information through msg3. The indicator for requesting to report downlink channel quality information through msg3 may be included in an RAR MAC PDU. When the RAR includes an indicator for requesting to report downlink channel quality information and the terminal 2c-05 has the capability to transmit downlink channel quality information, the terminal 2c-05 may configure downlink channel quality information based on the most recent effective measurement information (2c-35). The terminal 2c-05 may transmit msg3 including downlink channel quality information to the base station 2c-10 (2c-40). The downlink channel quality information may be included in a MAC CE or an RRC message.

When the downlink channel quality information is included in an RRC message, a new RRC message including the downlink channel quality information may be defined or an existing RRCEarlyDataRequest may be used. The new RRC message may belong to SRB0, and an RLC-SAP may be a transparent mode (TM).

According to other embodiments, regardless of whether the indicator is configured in the RAR, when the base station 2c-10 has the capability to receive downlink channel quality information and the terminal 2c-05 has the capability to transmit downlink channel quality information, the terminal 2c-05 may always transmit msg3 including downlink channel quality information or the terminal 2c-05 may transmit msg3 including downlink channel quality information only when the downlink channel quality is less than or equal to a particular threshold value. The above particular threshold value may be included in system information broadcast by the base station 2c-10. For example, when the downlink channel quality is defined as DL RSRP or DL RSRQ measured in CRS, the base station 2c-10 may broadcast system information including a threshold value in the RSRP or RSRQ.

Upon receiving the downlink channel quality information, the base station 2c-10 may schedule msg4 by using the downlink channel quality information (2c-45).

Figure 2D:
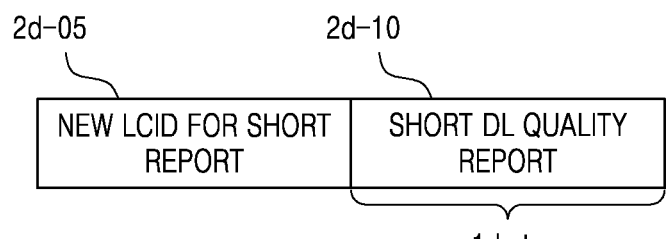
FIG. 2D is a diagram illustrating a structure of a MAC CE including downlink channel quality information, according to some embodiments.
Figure 2D:
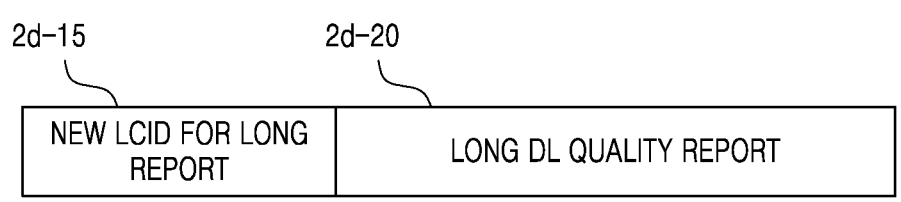

FIG. 2D is a diagram illustrating a structure of a MAC CE including downlink channel quality information, according to some embodiments.

According to an embodiment, the size of msg3 may vary according to the uplink channel state. For example, when the uplink channel state is poor, the size of msg3 may be small. Thus, the size of the MAC CE including downlink channel quality information may also need to be variable. In the disclosure, two MAC CE formats of a Short DL Quality Report MAC CE and a Long DL Quality Report MAC CE may be proposed. Also, in the disclosure, two new LCIDs respectively indicating two MAC CE formats may be defined. The LCIDs may be respectively included in MAC CE subheaders 2d-05 and 2d-15. A Short DL Quality Report MAC CE 2d-10 may have a size of 1 bit, and a Long DL Quality Report MAC CE 2d-20 may have a size of 2 bits or more. The terminal may select the Short DL Quality Report MAC CE when the measured downlink channel quality or uplink channel quality is less than or equal to a particular threshold value. The particular threshold value may be provided in system information by the base station. A Pmax value provided as system information may be used as the particular threshold value.

According to other embodiments, in order to minimize the complexity, only the Short DL Quality Report MAC CE and one new LCID corresponding thereto may be defined.

Figure 2E:
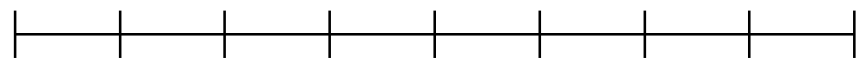
FIG. 2E is a diagram illustrating a method of configuring downlink channel quality information, according to some embodiments.
Figure 2E:
Figure 2E:
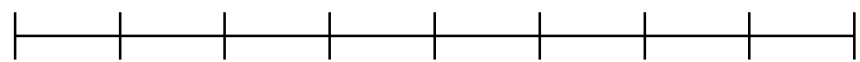
Figure 2E:
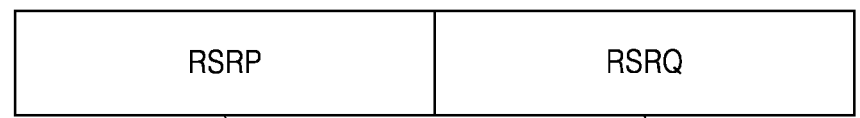

FIG. 2E is a diagram illustrating a method of configuring downlink channel quality information, according to some embodiments.

According to an embodiment, the downlink channel quality information may be RSRP or RSRQ. The downlink channel quality information may be obtained by measuring the CRS broadcast by the base station.

(a) of FIG. 2E illustrates a case where one of the RSRP value and the RSRQ value is included in the above Short DL Quality Report MAC CE. One or two reserved bits 2e-01 may be included. When the RSRP or the RSRQ is selectively included, 1 bit among the reserved bits may be used to indicate one of the two values. A field 2e-03 indicating the RSRP or RSRQ may indicate a particular index value, and the particular index value may indicate a particular range of the RSRP or RSRQ value.

According to an embodiment, instead of the above measured RSRP or RSRQ value, the following information may be considered as the downlink channel quality information.

Signal strength information (RSRP or RSRQ) required to decode (M)PDCCH while satisfying a certain block error rate (BLER) value, or Repetitive transmission count value of (M)PDCCH required to decode (M)PDCCH while satisfying a certain BLER value (b) of FIG. 2E illustrates a case where both the RSRP value and the RSRQ value are included in the above Short DL Quality Report MAC CE. For this purpose, the same number of bits may be used to indicate two values. 1~2 reserved bits may be included. The order in which RSRP and RSRQ fields 2e-05 and 2e-10 are included may be predetermined. A field indicating the RSRP or RSRQ may indicate a particular index value, and the particular index value may indicate a particular range of the RSRP or RSRQ value.

According to an embodiment, instead of the above measured RSRP or RSRQ value, the following information may be considered as the downlink channel quality information.

Signal strength information (RSRP or RSRQ) required to decode (M)PDCCH while satisfying a certain BLER value, or Repetitive transmission count value of (M)PDCCH required to decode (M)PDCCH while satisfying a certain BLER value (c) of FIG. 2E illustrates a case where both the RSRP value and the RSRQ value are included in the above Long DL Quality Report MAC CE. The order in which RSRP and RSRQ fields 2e-15 and 2e-20 are included may be predetermined. A field indicating the RSRP or RSRQ may indicate a particular index value, and the particular index value may indicate a particular range of the RSRP or RSRQ value.

Measurement parameters 2e-25 other than the above RSRP and RSRQ may be included in the above Short DL Quality Report MAC CE and Long DL Quality Report MAC CE.

According to an embodiment, instead of the above measured RSRP or RSRQ value, the following information may be considered as the downlink channel quality information.

Signal strength information (RSRP or RSRQ) required to decode (M)PDCCH while satisfying a certain BLER value, or Repetitive transmission count value of (M)PDCCH required to decode (M)PDCCH while satisfying a certain BLER value A field indicating the RSRP or RSRQ may indicate a particular index value, and the indicated particular index value may indicate a particular range of the RSRP or RSRQ value. For example, when a field value indicating the RSRP or RSRQ is 0 (2f-05), this may correspond to RSRP_0 or RSRQ_0 (2f-10) and RSRP_0 and RSRQ_0 may be x<RSRP_0 or RSRQ_0<y.

Figure 2G:
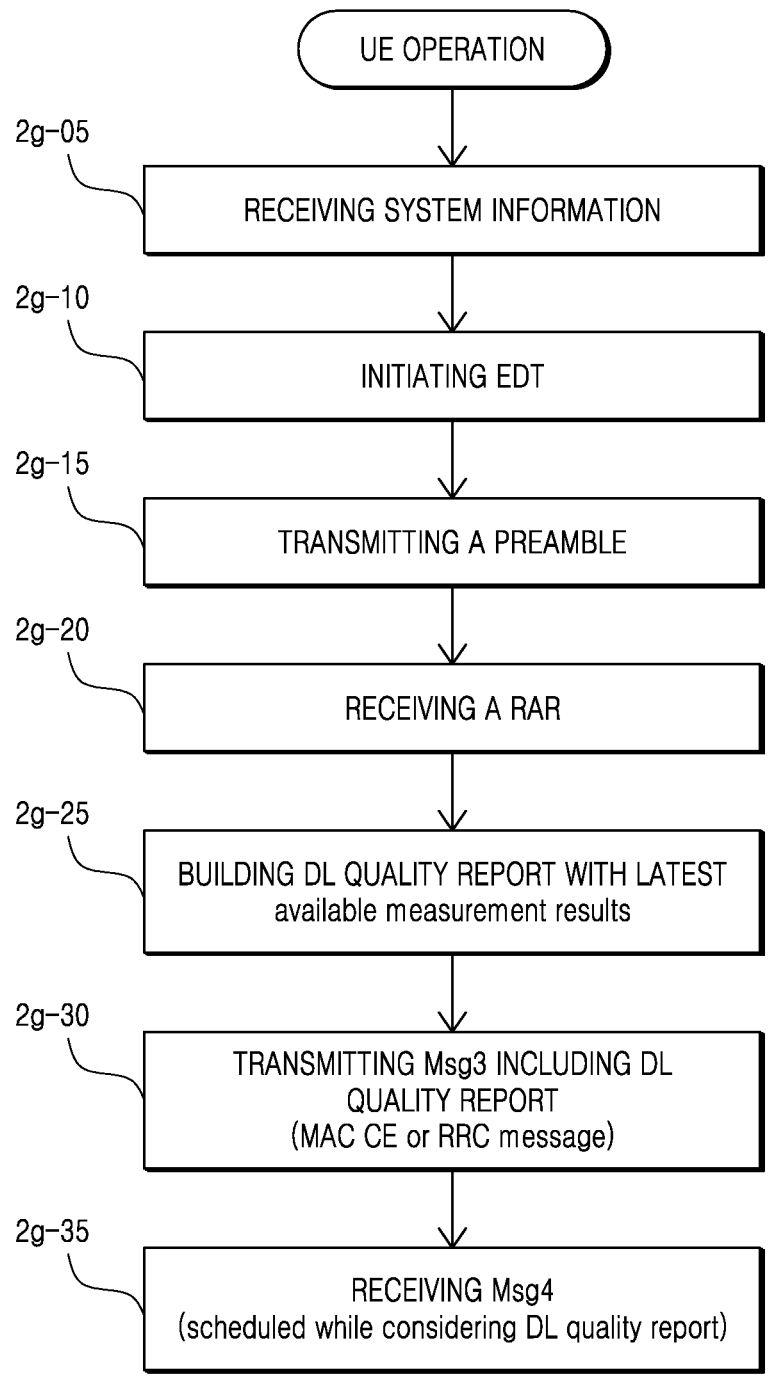
FIG. 2G is a flowchart illustrating an operation of a terminal according to some embodiments.

FIG. 2G is a flowchart illustrating an operation of a terminal according to some embodiments.

In operation 2g-05, the terminal may receive system information broadcast from the base station. The system information may include an indicator indicating that the base station has the capability to receive downlink channel quality information through msg3.

In operation 2g-10, the terminal may trigger an EDT operation.

In operation 2g-15, the terminal may transmit a preamble.

In operation 2g-20, the terminal may receive an RAR from the base station.

In operation 2g-25, when a certain indicator is included in the RAR or a certain condition is satisfied, the terminal may configure downlink channel quality information based on the most recent effective measurement information. Also, the terminal may determine a MAC CE format in which information is stored, according to a certain condition.

In operation 2g-30, the terminal may transmit msg3 including the configured downlink channel quality information to the base station.

In operation 2g-35, the terminal may receive msg4 from the base station.

The disclosure may propose a method of reporting the above downlink channel quality information to the base station through an msg3 message in an EDT operation as a technology for transmitting/receiving, by a terminal, certain small user data in a paging or random access process with the base station without switching from an idle mode (RRC_Idle) or an inactive mode (RRC_Inactive) to a connected mode (RRC_connected) in a mobile communication system.

The base station may broadcast whether it supports user plane (UP)-EDT or control plane (CP)-EDT, as system information to the terminal. In the case of UP EDT, AS security may be required, and an AS security mechanism in a resume process requiring a random access process up to msg4 may be reused. Lastly, because an HARQ operation may be applied in msg4, it may be possible to determine whether the user data has been successfully transmitted. In CP EDT, uplink user data may be included in an RRCEarlyDataRequest message transmitted in msg3, and downlink user data may be included in an RRCEarlyDataComplete message transmitted in msg4 when necessary.

When both the terminal and the base station support CP EDT and the CP EDT is triggered, the above downlink channel quality information may be included in the above RRCEarlyDataRequest. The RRCEarlyDataRequest message may include a signal strength information (RSRP or RSRQ) value required to decode (M)PDCCH while satisfying a certain BLER value or a repetitive transmission count value of (M)PDCCH required to decode (M)PDCCH while satisfying a certain BLER value. The above downlink channel quality information may not be included in a NAS container included in the RRCEarlyDataRequest and may be indicated by a separate information element (IE) or field.

When both the terminal and the base station support UP EDT and the UP EDT is triggered, a certain dedicated traffic channel (DTCH) including an RRCConnectionResumeRequest message and the above downlink channel quality information may be included in msg3. A new logical channel ID (LCID) or a bit indicating that a MAC SDU includes the above downlink channel quality may be included in a MAC header mapped to a MAC SDU mapped to the DTCH. The downlink channel quality information included in the above MAC SDU may be indicated by a new RRC message or a MAC CE. The MAC CE has been described above in detail. When msg3 includes downlink channel quality information, a cause value or an indicator indicating this may be included in the RRCConnectionResumeRequest message. The downlink channel quality information may include a signal strength information (RSRP or RSRQ) value required to decode (M)PDCCH while satisfying a certain BLER value (e.g., 1%) or a repetitive transmission count value of (M)PDCCH required to decode (M)PDCCH while satisfying a certain BLER value. The certain BLER value may be provided as system information from the base station.

Figure 2H:
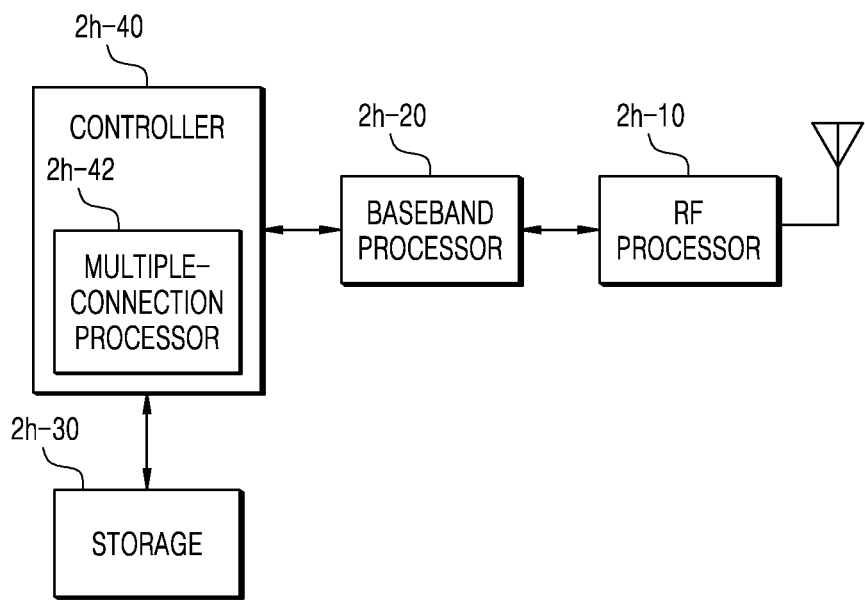
FIG. 2H is a block diagram illustrating a structure of a terminal according to some embodiments.

FIG. 2H is a block diagram illustrating a structure of a terminal according to some embodiments.

Referring to FIG. 2H, the terminal may include a radio frequency (RF) processor $2h$-10, a baseband processor $2h$-20, a storage $2h$-30, and a controller $2h$-40.

The RF processor $2h$-10 may perform functions for transmitting or receiving signals through wireless channels, such as band conversion and amplification of signals. That is, the RF processor $2h$-10 may up-convert a baseband signal provided from the baseband processor $2h$-20 into an RF band signal and transmit the same through an antenna and may down-convert an RF band signal received through the antenna into a baseband signal. For example, the RF processor $2h$-10 may include a transmission filter, a reception filter, an amplifier, a mixer, an oscillator, a digital-to-analog converter (DAC), and an analog-to-digital converter (ADC). Although only one antenna is illustrated in the drawings, the terminal may include a plurality of antennas. Also, the RF processor $2h$-10 may include a plurality of RF chains. In addition, the RF processor $2h$-10 may perform beamforming. For beamforming, the RF processor $2h$-10 may adjust the phase and magnitude of each of the signals transmitted/received through a plurality of antennas or antenna elements. Also, the RF processor may perform multiple-input and multiple-output (MIMO) and may receive multiple layers when performing a MIMO operation.

The baseband processor $2h$-20 may perform a conversion function between a baseband signal and a bit string according to the physical layer standard of the system. For example, during data transmission, the baseband processor $2h$-20 may generate complex symbols by encoding and modulating a transmission bit string. Also, during data reception, the baseband processor $2h$-20 may restore a reception bit string by demodulating and decoding the baseband signal provided from the RF processor $2h$-10. For example, according to an OFDM scheme, during data transmission, the baseband processor $2h$-20 may generate complex symbols by encoding and modulating a transmission bit string, map the complex symbols to subcarriers, and then configure OFDM symbols through an inverse fast Fourier transform (IFFT) operation and cyclic prefix (CP) insertion. Also, during data reception, the baseband processor $2h$-20 may divide the baseband signal provided from the RF processor $2h$-10 into OFDM symbol units, restore signals mapped to the subcarriers through a fast Fourier transform (FFT) operation, and then restore a reception bit string through demodulation and decoding.

The baseband processor $2h$-20 and the RF processor $2h$-10 may transmit and receive signals as described above. Accordingly, the baseband processor $2h$-20 and the RF processor $2h$-10 may be referred to as a transmitter, a receiver, a transceiver, or a communicator. In addition, at least one of the baseband processor $2h$-20 and the RF processor $2h$-10 may include a plurality of communication modules to support a plurality of different radio access technologies. Also, at least one of the baseband processor $2h$-20 and the RF processor $2h$-10 may include a plurality of communication modules to process signals of different frequency bands. For example, the different radio access technologies may include wireless LAN (e.g., IEEE 802.11) and cellular network (e.g., LTE). Also, the different frequency bands may include a super high frequency (SHF) (e.g., 2.5 GHz or 5 GHz) band and a millimeter wave (e.g., 60 GHz) band.

The storage $2h$-30 may store data such as a basic program, an application program, or configuration information for an operation of the terminal. Particularly, the storage $2h$-30 may store information related to a second access node performing wireless communication by using a second radio access technology. Also, the storage $2h$-30 may provide the stored data at the request of the controller $2h$-40.

The controller $2h$-40 may control overall operations of the terminal. For example, the controller $2h$-40 may transmit/receive signals through the baseband processor $2h$-20 and the RF processor $2h$-10. Also, the controller $2h$-40 may write/read data into/from the storage $2h$-30. For this purpose, the controller $2h$-40 may include at least one processor. For example, the controller $2h$-40 may include a communication processor (CP) for performing control for communication and an application processor (AP) for controlling an upper layer such as an application program.

The controller $2h$-40 may control a series of processes such that the terminal may operate according to the above embodiments. According to some embodiments, the controller $2h$-40 may control the components of the terminal to receive system information broadcast from the base station and including an indicator indicating that the base station has the capability to receive downlink channel quality information through msg3, and to trigger an EDT operation. Also, the controller $2h$-40 may control the components of the terminal to transmit a preamble, to receive an RAR from the base station, to configure downlink channel quality information based on the most recent effective measurement information when a certain indicator is included in the RAR or a certain condition is satisfied, and to determine a MAC CE format in which information is included, according to a certain condition. Also, the controller $2h$-40 may control the components of the terminal to transmit msg3 including the configured downlink channel quality information to the base station and to receive msg4 from the base station.

Figure 2I:
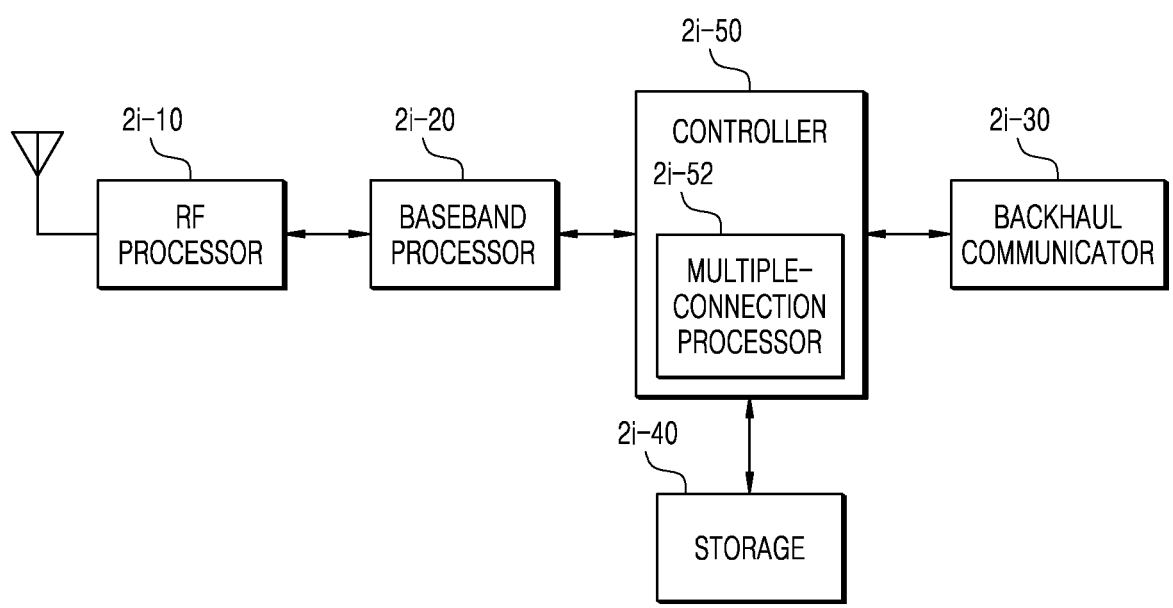
FIG. 2I is a block diagram illustrating a structure of a base station according to some embodiments.

FIG. 2I is a block diagram illustrating a structure of a base station according to some embodiments.

As illustrated in FIG. 2I, the base station may include an RF processor $2i$-10, a baseband processor $2i$-20, a backhaul communicator $2i$-30, a storage $2i$-40, and a controller $2i$-50.

The RF processor $2i$-10 may perform functions for transmitting or receiving signals through radio channels, such as band conversion and amplification of signals. That is, the RF processor $2i$-10 may up-convert a baseband signal provided from the baseband processor $2i$-20 into an RF band signal and transmit the same through an antenna and may down-convert an RF band signal received through the antenna into a baseband signal. For example, the RF processor $2i$-10 may include a transmission filter, a reception filter, an amplifier, a mixer, an oscillator, a DAC, and an ADC. Although only one antenna is illustrated in the drawings, a first access node may include a plurality of antennas. Also, the RF processor $2i$-10 may include a plurality of RF chains. In addition, the RF processor $2i$-10 may perform beamforming. For beamforming, the RF processor $2i$-10 may adjust the phase and magnitude of each of the signals transmitted/received through a plurality of antennas or antenna elements. The RF processor may perform a downlink MIMO operation by transmitting one or more layers.

The baseband processor $2i$-20 may perform a conversion function between a baseband signal and a bit string according to the physical layer standard of a first radio access technology. For example, during data transmission, the baseband processor 2*i*-20 may generate complex symbols by encoding and modulating a transmission bit string. Also, during data reception, the baseband processor 2*i*-20 may restore a reception bit string by demodulating and decoding the baseband signal provided from the RF processor 2*i*-10. For example, according to the OFDM scheme, during data transmission, the baseband processor 2*i*-20 may generate complex symbols by encoding and modulating a transmission bit string, map the complex symbols to subcarriers, and then configure OFDM symbols through an IFFT operation and CP insertion. Also, during data reception, the baseband processor 2*i*-20 may divide the baseband signal provided from the RF processor 2*i*-10 into OFDM symbol units, restore signals mapped to the subcarriers through an FFT operation, and then restore a reception bit string through demodulation and decoding. The baseband processor 2*i*-20 and the RF processor 2*i*-10 may transmit and receive signals as described above. Accordingly, the baseband processor 2*i*-20 and the RF processor 2*i*-10 may be referred to as a transmitter, a receiver, a transceiver, a communicator, or a wireless communicator.

The backhaul communicator 2*i*-30 may provide an interface for communicating with other nodes in the network. That is, the backhaul communicator 2*i*-30 may convert a bit string transmitted from the base station to another node, for example, an auxiliary base station, a core network, or the like, into a physical signal and may convert a physical signal received from another node into a bit string.

The storage 2*i*-40 may store data such as a basic program, an application program, or configuration information for an operation of the base station. Particularly, the storage 2*i*-40 may store information about a bearer allocated to a connected terminal, a measurement result reported from the connected terminal, or the like. Also, the storage 2*i*-40 may store information that is a reference for determining whether to provide or terminate a multiple connection to the terminal. Also, the storage 2*i*-40 may provide the stored data at the request of the controller 2*i*-50.

The controller 2*i*-50 may control overall operations of the base station. For example, the controller 2*i*-50 may transmit/receive signals through the baseband processor 2*i*-20 and the RF processor 2*i*-10 or through the backhaul communicator 2*i*-30. Also, the controller 2*i*-50 may write/read data into/from the storage 2*i*-40. For this purpose, the controller 2*i*-50 may include at least one processor.

Figure 3A:
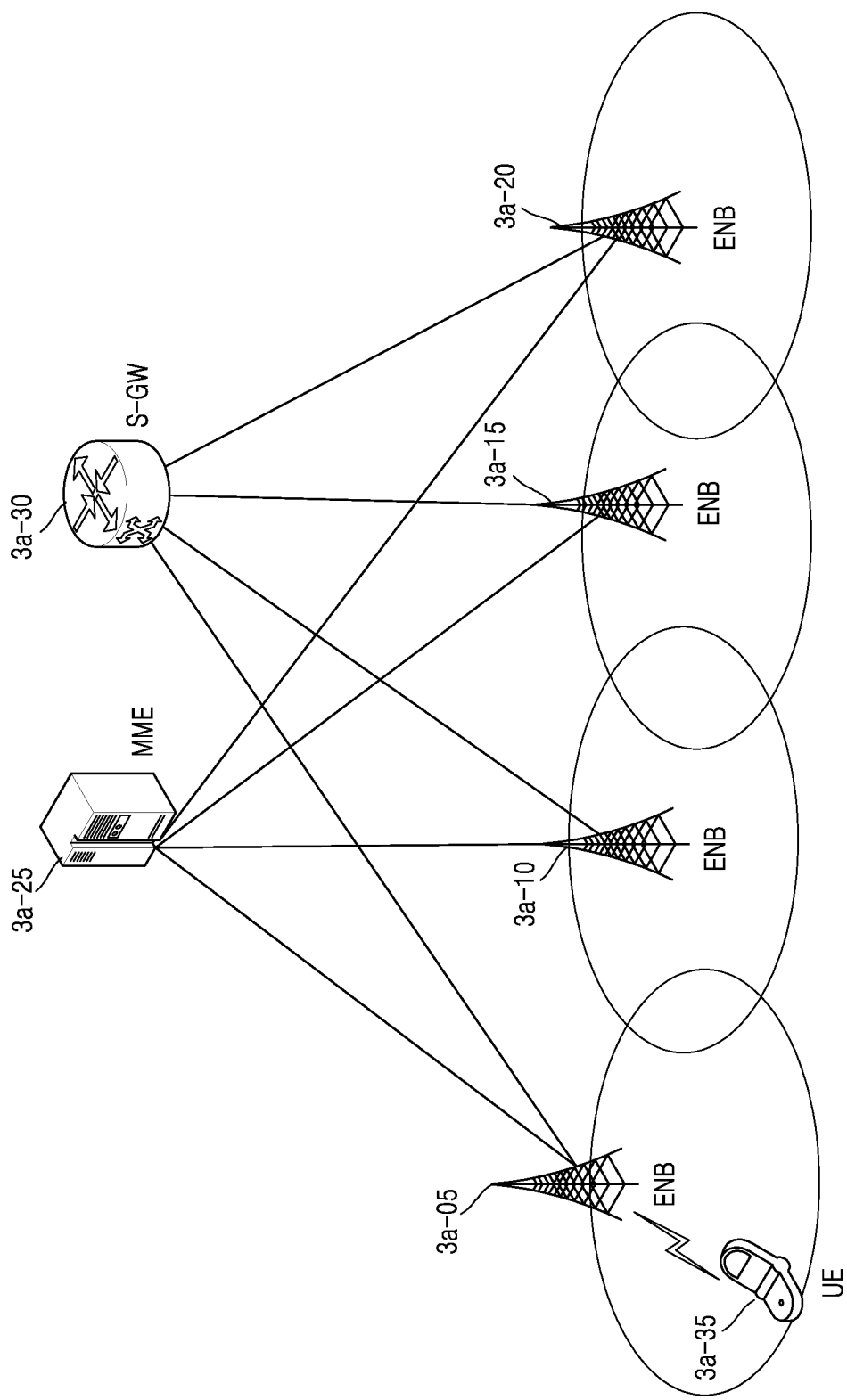
FIG. 3A is a diagram illustrating a structure of an LTE system according to some embodiments.

FIG. 3A is a diagram illustrating a structure of an LTE system according to some embodiments.

Referring to FIG. 3A, a radio access network of the LTE system may include next-generation base stations (e.g., evolved Node Bs (eNBs), Node Bs, or base stations) 3*a*-05, 3*a*-10, 3*a*-15, and 3*a*-20, a mobility management entity (MME) 3*a*-25, and a serving-gateway (S-GW) 3*a*-30. A user terminal (e.g., a user equipment (UE) or a terminal) 3*a*-35 may access an external network through the eNBs 3*a*-05 to 3*a*-20 and the S-GW 3*a*-30.

In FIG. 3A, the eNBs 3*a*-05 to 3*a*-20 may correspond to the existing Node Bs of the UMTS system. The eNB may be connected to the UE 3*a*-35 through a radio channel and may perform a more complex function than the existing Node B. In the LTE system, because all user traffic including real-time services such as Voice over IP (VoIP) through the Internet protocol is serviced through a shared channel, an apparatus for collecting and scheduling state information such as UEs' buffer states, available transmission power states, or channel states may be required, which may be managed by the eNBs 3*a*-05 to 3*a*-20. One eNB may generally control a plurality of cells. For example, in order to implement a transmission rate of 100 Mbps, the LTE system may use orthogonal frequency division multiplexing (OFDM) in a 20 MHz bandwidth as a radio access technology. Also, an adaptive modulation & coding (AMC) scheme may be applied to determine a modulation scheme and a channel coding rate according to the channel state of a terminal. The S-GW 3*a*-30 may be an apparatus for providing a data bearer and may generate or remove a data bearer under the control by the MME 3*a*-25. The MME may be an apparatus for performing various control functions as well as a mobility management function for a terminal and may be connected to a plurality of base stations.

Figure 3B:
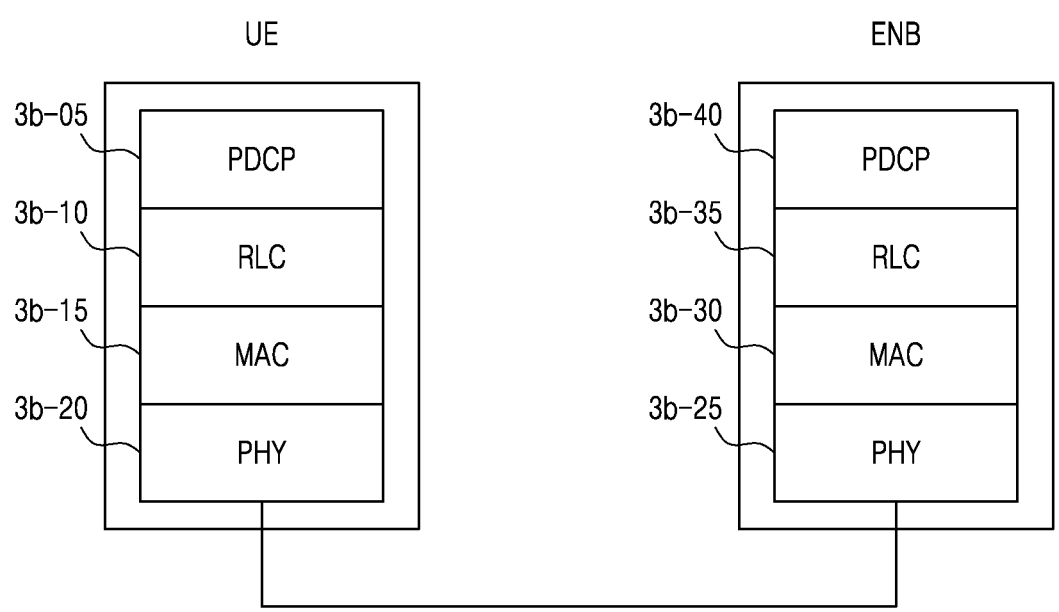
FIG. 3B is a diagram illustrating a radio protocol architecture in an LTE system according to some embodiments.

FIG. 3B is a diagram illustrating a radio protocol architecture in an LTE system according to some embodiments.

Referring to FIG. 3B, the radio protocol of the LTE system may include Packet Data Convergence Protocol (PDCP) 3*b*-05 and 3*b*-40, Radio Link Control (RLC) 3*b*-10 and 3*b*-35, and Medium Access Control (MAC) 3*b*-15 and 3*b*-30 in each of a terminal and an eNB. The PDCP 3*b*-05 and 3*b*-40 may perform operations such as Internet Protocol (IP) header compression/decompression, and the RLC 3*b*-10 and 3*b*-35 may reconstruct a PDCP packet data unit (PDU) in a suitable size to perform an ARQ operation or the like. The MAC 3*b*-15 and 3*b*-30 may be connected to several RLC entities configured in one terminal and may perform an operation of multiplexing RLC PDUs into MAC PDUs and demultiplexing RLC PDUs from MAC PDUs. Physical layers 3*b*-20 and 3*b*-25 may channel-code and modulate upper layer data, generate OFDM symbols, and transmit the same through radio channels or may demodulate and channel-decode OFDM symbols received through radio channels and transmit the result thereof to the upper layer.

Most of the wireless devices belonging to Machine Type Communication (MTC) or Internet of Things (IoT) may have characteristics of low performance and low cost according to their purposes and thus may perform an operation in the configured narrowband instead of performing a data transmission/reception operation in the entire system frequency band. In a limited radio resource such as the narrowband, data may need to be effectively scheduled. For example, data to be transmitted may need to be divided and transmitted multiple times through multiple scheduling. When scheduling for several transmissions may be performed at once, radio resources required to provide scheduling information may be saved. The disclosure may propose a method of scheduling multiple transport blocks (TBs) by one DCI. The DCI may be control information transmitted on the PDCCH (or MPDCCH or NPDCCH) and may mainly include scheduling information on the corresponding PDSCH. In the disclosure, the description may focus on downlink scheduling but may also be applied to uplink scheduling.

Figure 3C:
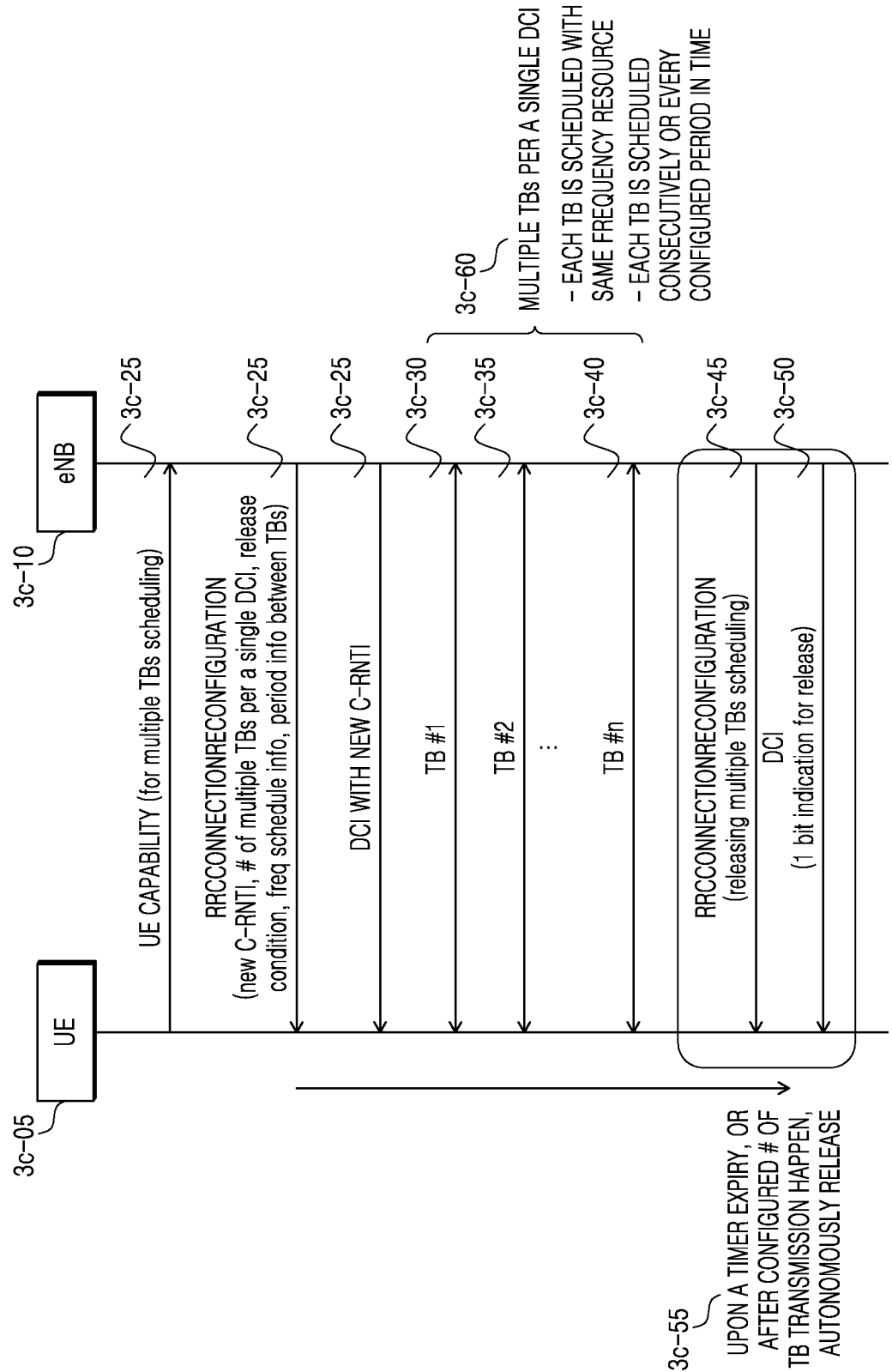
FIG. 3C is a flowchart illustrating a process of performing data scheduling, according to some embodiments.

FIG. 3C is a flowchart illustrating a process of performing data scheduling, according to some embodiments.

A terminal 3*c*-05 may report to a base station 3*c*-10 that it supports an operation of scheduling a plurality of TBs through a single DCI (3*c*-15). The terminal 3*c*-05 may report up to what number of TBs is possible by single scheduling, through a capability report.

The base station 3*c*-10 may configure scheduling of a plurality of TBs by single DCI by using an RRCConnectionReconfiguration message (3*c*-20). The configuration information may include at least one of the following information.

New C-RNTI: It may be used to indicate DCI for scheduling a plurality of TBs.

Multiple scheduling DCI indicator: It may be an indicator included in the DCI and may indicate whether the scheduling information included in the DCI corresponds to only one TB or a plurality of TBs. When the indicator is defined, a separate C-RNTI indicating the type of the DCI may not be required.

Number of TBs scheduled per DCI

Release condition: Conditions for releasing configuration information

Frequency scheduling information: In order to optimize the size of the scheduling information, all the TBs scheduled by one DCI may use the same frequency radio resource. In this case, the DCI may provide scheduling information on one frequency.

Time scheduling information: In order to optimize the size of the scheduling information, the first TB may be scheduled in the PDSCH corresponding to the PDCCH including the DCI and the next TB may be scheduled in every configured time period. The DCI may include time period information, and the time information may be configured in subframe units or particular time slot units.

The terminal 3c-05 may receive the DCI indicated by a new C-RNTI, on the PDCCH (3c-25). Alternatively, the terminal 3c-05 may receive the DCI including a multiple scheduling DCI indicator, on the PDCCH. The terminal 3c-05 may transmit/receive data by using a plurality of TBs 3c-30, 3c-35, and 3c-40 scheduled by the DCI. In order to minimize the scheduling information, the TBs may use the same frequency radio resource and may have a certain period between the TBs (3c-60).

The base station 3c-10 may release the configuration information by using a certain RRC message 3c-45 or a certain indicator 3c-50 in the DCI.

When the base station 3c-10 configures scheduling of a plurality of TBs by single DCI by using an RRCConnectionReconfiguration message, it may start one timer and may release the configuration information when the timer expires (3c-55).

Lastly, the configuration information may be automatically released when a fixed number of DCI schedulings occur.

FIG. 3D is a flowchart illustrating an operation of a terminal according to some embodiments.

In operation 3d-05, the terminal in the connected mode may report its capability information to the base station. The capability information may include an indicator indicating that the terminal itself supports an operation of scheduling a plurality of TBs through single DCI.

In operation 3d-10, the terminal may receive a certain RRC message from the base station. The RRC message may include configuration information related to an operation of scheduling a plurality of TBs by single DCI.

In operation 3d-15, the terminal may receive the DCI indicated by the C-RNTI included in the configuration information, from the base station on the PDCCH. Alternatively, the terminal may receive the DCI including a multiple scheduling DCI indicator, on the PDCCH.

In operation 3d-20, the terminal may transmit/receive data by using a plurality of TBs scheduled by the DCI.

In operation 3d-25, the terminal may receive a certain RRC message including a release indicator from the base station and may stop a plurality of TB scheduling operations.

Figure 3E:
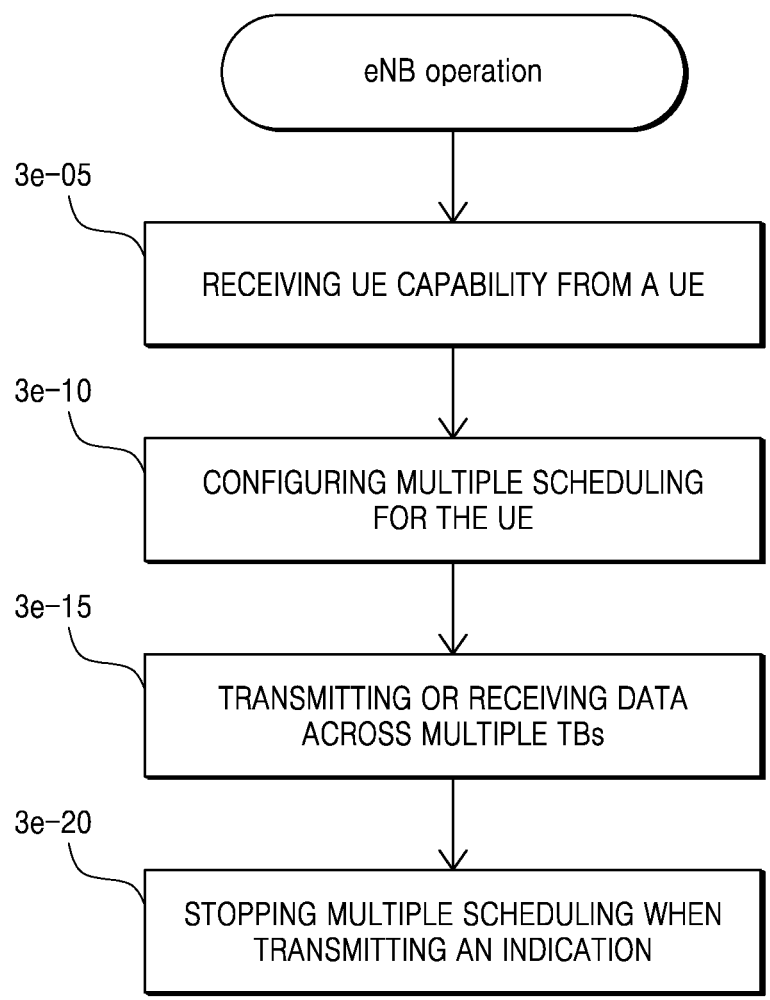
FIG. 3E is a flowchart illustrating an operation of a base station according to some embodiments.

FIG. 3E is a flowchart illustrating an operation of a base station according to some embodiments.

In operation 3e-05, the base station may receive a report of terminal capability information from the terminal. The capability information may include an indicator indicating that the terminal itself supports an operation of scheduling a plurality of TBs through single DCI.

In operation 3e-10, the base station may configure an operation of scheduling a plurality of TBs by single DCI to the terminal.

In operation 3e-15, the base station may transmit/receive data by using a plurality of TBs scheduled by the DCI.

In operation 3e-20, the base station may transmit a certain RRC message including a release indicator in order to stop a plurality of TB scheduling operations.

Figure 3F:
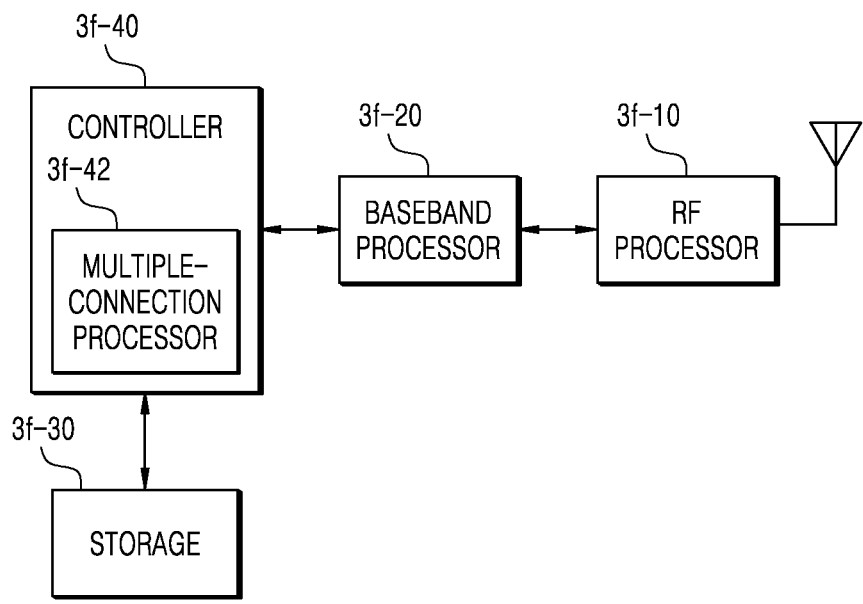
FIG. 3F is a block diagram illustrating a structure of a terminal according to some embodiments.

FIG. 3F is a block diagram illustrating a structure of a terminal according to some embodiments.

Referring to FIG. 3F, the terminal may include a radio frequency (RF) processor 3f-10, a baseband processor 3f-20, a storage 3f-30, and a controller 3f-40.

The RF processor 3f-10 may perform functions for transmitting or receiving signals through radio channels, such as band conversion and amplification of signals. That is, the RF processor 3f-10 may up-convert a baseband signal provided from the baseband processor 3f-20 into an RF band signal and transmit the same through an antenna and may down-convert an RF band signal received through the antenna into a baseband signal. For example, the RF processor 3f-10 may include a transmission filter, a reception filter, an amplifier, a mixer, an oscillator, a digital-to-analog converter (DAC), and an analog-to-digital converter (ADC). Although only one antenna is illustrated in the drawings, the terminal may include a plurality of antennas. Also, the RF processor 3f-10 may include a plurality of RF chains. In addition, the RF processor 3f-10 may perform beamforming. For beamforming, the RF processor 3f-10 may adjust the phase and magnitude of each of the signals transmitted/received through a plurality of antennas or antenna elements. Also, the RF processor may perform multiple-input and multiple-output (MIMO) and may receive multiple layers when performing a MIMO operation.

The baseband processor 3f-20 may perform a conversion function between a baseband signal and a bit string according to the physical layer standard of the system. For example, during data transmission, the baseband processor 3f-20 may generate complex symbols by encoding and modulating a transmission bit string. Also, during data reception, the baseband processor 3f-20 may restore a reception bit string by demodulating and decoding the baseband signal provided from the RF processor 3f-10. For example, according to an OFDM scheme, during data transmission, the baseband processor 3f-20 may generate complex symbols by encoding and modulating a transmission bit string, map the complex symbols to subcarriers, and then configure OFDM symbols through an inverse fast Fourier transform (IFFT) operation and cyclic prefix (CP) insertion. Also, during data reception, the baseband processor 3f-20 may divide the baseband signal provided from the RF processor 3f-10 into OFDM symbol units, restore signals mapped to the subcarriers through a fast Fourier transform (FFT) operation, and then restore a reception bit string through demodulation and decoding.

The baseband processor 3f-20 and the RF processor 3f-10 may transmit and receive signals as described above. Accordingly, the baseband processor 3f-20 and the RF processor 3f-10 may be referred to as a transmitter, a receiver, a transceiver, or a communicator. In addition, at least one of the baseband processor 3f-20 and the RF processor 3f-10 may include a plurality of communication modules to support a plurality of different radio access technologies. Also, at least one of the baseband processor 3*f*-20 and the RF processor 3*f*-10 may include a plurality of communication modules to process signals of different frequency bands. For example, the different radio access technologies may include wireless LAN (e.g., IEEE 802.11) and cellular network (e.g., LTE). Also, the different frequency bands may include a super high frequency (SHF) (e.g., 2.5 GHz or 5 GHz) band and a millimeter wave (e.g., 60 GHz) band.

The storage 3*f*-30 may store data such as a basic program, an application program, or configuration information for operation of the terminal. Particularly, the storage 3*f*-30 may store information related to a second access node performing wireless communication by using a second radio access technology. Also, the storage 3*f*-30 may provide the stored data at the request of the controller 3*f*-40.

The controller 3*f*-40 may control overall operations of the terminal. For example, the controller 3*f*-40 may transmit/receive signals through the baseband processor 3*f*-20 and the RF processor 3*f*-10. Also, the controller 3*f*-40 may write/read data into/from the storage 3*f*-30. For this purpose, the controller 3*f*-40 may include at least one processor. For example, the controller 3*f*-40 may include a communication processor (CP) for performing control for communication and an application processor (AP) for controlling an upper layer such as an application program.

The controller 3*f*-40 may control a series of processes such that the terminal may operate according to the above embodiments. According to some embodiments, the controller 3*f*-40 may control the components of the terminal to report to the base station capability information including an indicator indicating that the terminal itself supports an operation of scheduling a plurality of TBs through single DCI and to receive a certain RRC message from the base station. Also, the controller 3*f*-40 may control the components of the terminal to receive the DCI indicated by the C-RNTI included in the configuration information, from the base station on the PDCCH or receive the DCI including a multiple scheduling DCI indicator on the PDCCH, to transmit/receive data by using a plurality of TBs scheduled by the DCI, to receive a certain RRC message including a release indicator from the base station, and to stop a plurality of TB scheduling operations.

Figure 3G:
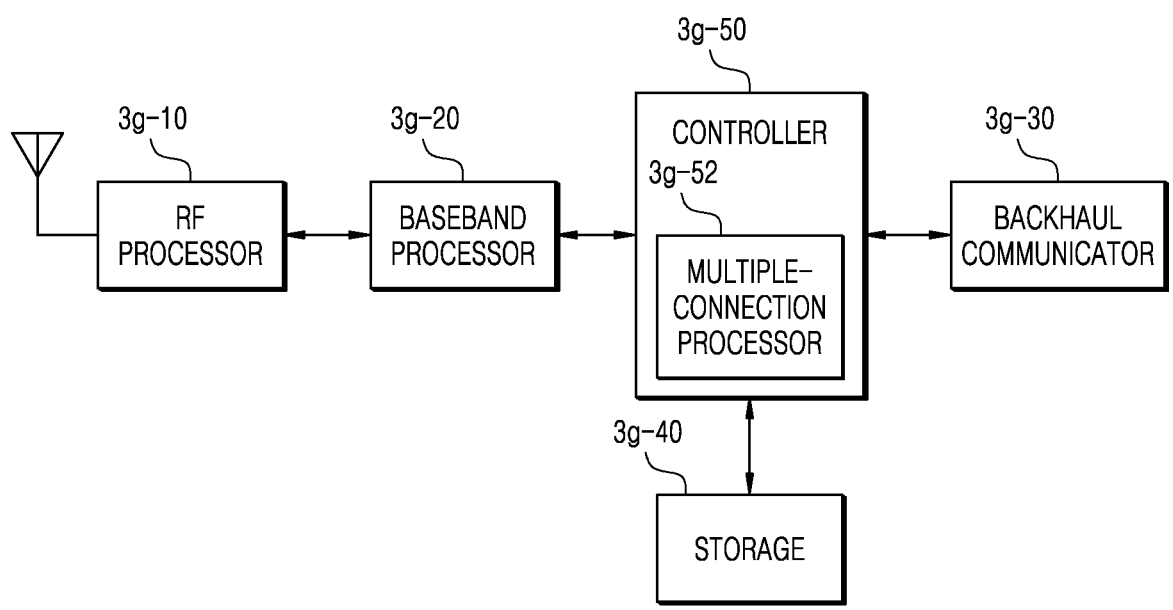
FIG. 3G is a block diagram illustrating a structure of a base station according to some embodiments.

FIG. 3G is a block diagram illustrating a structure of a base station according to some embodiments.

As illustrated in FIG. 3G, the base station may include an RF processor 3*g*-10, a baseband processor 3*g*-20, a backhaul communicator 3*g*-30, a storage 3*g*-40, and a controller 3*g*-50.

The RF processor 3*g*-10 may perform functions for transmitting or receiving signals through wireless channels, such as band conversion and amplification of signals. That is, the RF processor 3*g*-10 may up-convert a baseband signal provided from the baseband processor 3*g*-20 into an RF band signal and transmit the same through an antenna and may down-convert an RF band signal received through the antenna into a baseband signal. For example, the RF processor 3*g*-10 may include a transmission filter, a reception filter, an amplifier, a mixer, an oscillator, a DAC, and an ADC. Although only one antenna is illustrated in the drawings, a first access node may include a plurality of antennas. Also, the RF processor 3*g*-10 may include a plurality of RF chains. In addition, the RF processor 3*g*-10 may perform beamforming. For beamforming, the RF processor 3*g*-10 may adjust the phase and magnitude of each of the signals transmitted/received through a plurality of antennas or antenna elements. The RF processor may perform a downlink MIMO operation by transmitting one or more layers.

The baseband processor 3*g*-20 may perform a conversion function between a baseband signal and a bit string according to the physical layer standard of a first radio access technology. For example, during data transmission, the baseband processor 3*g*-20 may generate complex symbols by encoding and modulating a transmission bit string. Also, during data reception, the baseband processor 3*g*-20 may restore a reception bit string by demodulating and decoding the baseband signal provided from the RF processor 3*g*-10. For example, according to the OFDM scheme, during data transmission, the baseband processor 3*g*-20 may generate complex symbols by encoding and modulating a transmission bit string, map the complex symbols to subcarriers, and then configure OFDM symbols through an IFFT operation and CP insertion. Also, during data reception, the baseband processor 3*g*-20 may divide the baseband signal provided from the RF processor 3*g*-10 into OFDM symbol units, restore signals mapped to the subcarriers through an FFT operation, and then restore a reception bit string through demodulation and decoding. The baseband processor 3*g*-20 and the RF processor 3*g*-10 may transmit and receive signals as described above. Accordingly, the baseband processor 3*g*-20 and the RF processor 3*g*-10 may be referred to as a transmitter, a receiver, a transceiver, a communicator, or a wireless communicator.

The backhaul communicator 3*g*-30 may provide an interface for communicating with other nodes in the network. That is, the backhaul communicator 3*g*-30 may convert a bit string transmitted from the base station to another node, for example, an auxiliary base station, a core network, or the like, into a physical signal and may convert a physical signal received from another node into a bit string.

The storage 3*g*-40 may store data such as a basic program, an application program, or configuration information for operation of the base station. Particularly, the storage 3*g*-40 may store information about a bearer allocated to a connected terminal, a measurement result reported from the connected terminal, or the like. Also, the storage 3*g*-40 may store information that is a reference for determining whether to provide or terminate multiple connections to the terminal. Also, the storage 3*g*-40 may provide the stored data at the request of the controller 3*g*-50.

The controller 3*g*-50 may control overall operations of the base station. For example, the controller 3*g*-50 may transmit/receive signals through the baseband processor 3*g*-20 and the RF processor 3*g*-10 or through the backhaul communicator 3*g*-30. Also, the controller 3*g*-50 may write/read data into/from the storage 3*g*-40. For this purpose, the controller 3*g*-50 may include at least one processor.

The controller 3*g*-50 may control a series of processes such that the terminal may operate according to the above embodiments. According to some embodiments, the controller 3*g*-50 may control the components of the base station to receive a report of terminal capability information including an indicator indicating that the terminal itself supports an operation of scheduling a plurality of TBs through single DCI, from the terminal and to configure an operation of scheduling a plurality of TBs by single DCI to the terminal. Also, the controller 3*g*-50 may control the components of the base station to transmit/receive data by using a plurality of TBs scheduled by the DCI and to transmit a certain RRC message including a release indicator in order to stop a plurality of TB scheduling operations.

Figure 4A:
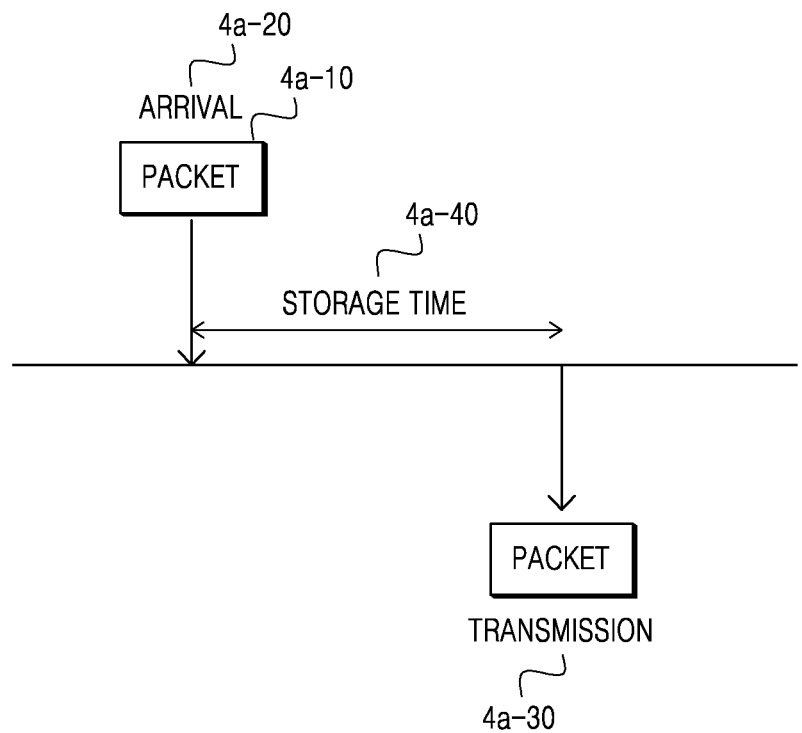
FIG. 4A is a diagram illustrating a packet storage time in a transmitter according to some embodiments.

FIG. 4A is a diagram illustrating a packet storage time in a transmitter according to some embodiments.

When a packet 4a-10 arrives at the transmitter and the packet is not immediately transmitted, the packet may need to be stored in the receiver to be waited until the transmission time point. This phenomenon may occur when a radio resource is not immediately available. For example, when a terminal in a cellular communication system is a transmitter, because the terminal should perform transmission by using a radio resource configured by the base station, in most cases, the packet arriving at the terminal that is a transmitter may be stored and waited until the actual transmission time point. In this case, the time taken until the packet is actually transmitted (4a-30) may be referred to as a storage time 4a-40. The storage time 4a-40 may include the time taken for processing after the packet arrives at the transmitter.

The storage time 4a-40 may be generally included in an end-to-end delay time of the packet. In uplink cellular communication, the end-to-end delay time of the packet may include the following components.

Processing time in the transmitter
Storage time in the transmitter
Processing time in the network
Delay time in the network
Processing time in the receiver When the storage time in the transmitter occupies a higher proportion than other components, reducing the storage time in the transmitter may affect the overall quality of service (QoS).

Figure 4B:
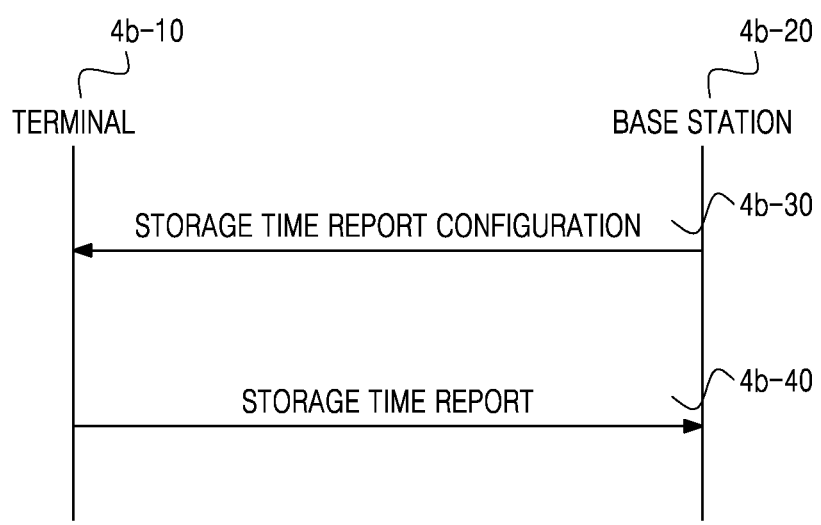
FIG. 4B is a diagram illustrating an operation of performing a storage time report, according to some embodiments.

FIG. 4B is a diagram illustrating an operation of performing a storage time report, according to some embodiments.

Referring to FIG. 4B, in a cellular communication system, a terminal 4b-10 and a base station 4b-20 may perform a storage time report. When the storage time occurring in the terminal 4b-10 described in FIG. 4A may be reported to the base station 4b-20, it may be said to be useful because the base station 4b-20 may be used for purposes such as resource allocation. However, when the terminal 4b-10 randomly performs a storage time report, because this may cause a waste of radio resources, the base station 4b-20 may pre-configure, to the terminal 4b-10, a condition for performing a storage time report or a value to be reported (4b-30). This may be referred to as a storage time report configuration message, and the storage time report configuration message may be included and transmitted in an information element (IE) of an RRC configuration message or may be transmitted as a control protocol data unit (PDU).

The storage time report configuration message transmitted from the base station 4b-20 to the terminal 4b-10 may include a condition in which the terminal 4b-10 transmits a storage time report message. The condition for transmitting the storage time report message may include at least one of the following examples.

The storage time of a packet is greater than a pre-configured threshold value.
The storage time of a packet is less than a pre-configured threshold value.
The allowable delay margin of a packet is greater than a configured threshold value.
The allowable delay margin of a packet is less than a configured threshold value.
A packet exceeds a delay requirement.
A packet satisfies a delay requirement.
The storage time of packets in a QoS flow or a radio bearer is greater than a pre-configured threshold value.
The storage time of packets in a QoS flow or a radio bearer is less than a pre-configured threshold value.
The allowable delay margin of a packet in a QoS flow or a radio bearer is greater than a configured threshold value.
The allowable delay margin of a packet in a QoS flow or a radio bearer is less than a configured threshold value.
A packet in a QoS flow or a radio bearer exceeds a delay requirement.
A packet in a QoS flow or a radio bearer satisfies a delay requirement.
The proportion of a packet the storage time of which is greater than a pre-configured threshold value is greater than a configured threshold value.
The proportion of a packet the storage time of which is greater than a pre-configured threshold value is less than a configured threshold value.
The proportion of a packet exceeding a delay requirement is greater than a configured threshold value.
The proportion of a packet exceeding a delay requirement is less than a configured threshold value.
The proportion of a packet deleted by a deletion timer is greater than a configured threshold value.
The proportion of a packet deleted by a deletion timer is less than a configured threshold value.
The terminal or the application program of the terminal determines that it is necessary to report the storage time.
Periodic reporting (every certain time)
It is reported when the terminal receives a storage time report configuration message.

The terminal 4b-10 may transmit a storage time report message to the base station 4b-20 when the condition configured in the storage time report configuration message is satisfied or when the terminal 4b-10 determines that a storage time report is necessary (4b-40). In this case, a value that may be included in the storage time report message may include at least one of the following.

The average storage time of the packet
The storage time of the recent packet
The average allowable delay margin of the packet
The rate at which the packet storage time exceeds a configured threshold value
The proportion of the packet deleted by a deletion timer
The proportion of the packet exceeding a delay requirement
The delay requirement of a DRB or a QoS flow In this case, when the packet storage time is reported the storage time report message, the unit of this value may be a time component such as second (s), millisecond (ms), and microsecond (μs). According to an embodiment, the unit may be a system frame number (SFN), a frame, a subframe, a slot, or a symbol length that is a value used in the communication system. Also, because the above values may be affected by subcarrier spacing (SCS), subcarrier spacing information may be transmitted together.

Figure 4C:
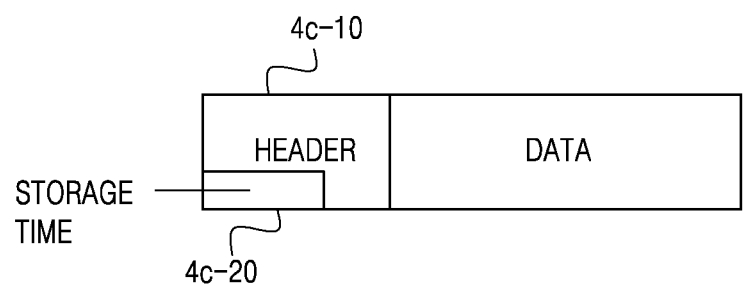
FIG. 4C is a diagram illustrating an embodiment in which a packet storage time is transmitted, according to some embodiments.

FIG. 4C is a diagram illustrating an embodiment in which a packet storage time is transmitted, according to some embodiments.

The storage time of a packet may have a different value for each packet depending on the situation of the transmitter. In this case, the transmitter may transmit the storage time of the packet to the receiver. For this purpose, a storage time 4c-20 may be included in a header 4c-10 of the packet. In this case, a storage time field may be a fixed field or a variable field of the header. When the storage time field is a variable field of the header, a 1-bit indicator may be used to indicate that the storage time field is included. When the storage time field is a fixed field of the header, a header including a storage time field may be used for data for which a storage time field always exists and a storage time should be reported.

Figure 4D:
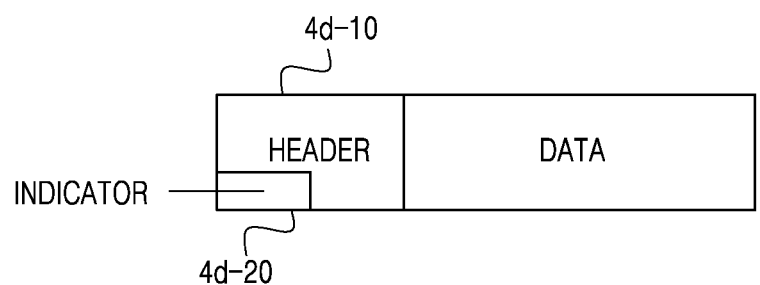
FIG. 4D is a diagram illustrating an embodiment of reporting whether a particular matter related to a packet storage time has occurred, according to some embodiments.

FIG. 4D is a diagram illustrating an embodiment of reporting whether a particular matter related to a packet storage time has occurred, according to some embodiments.

The storage time of a packet may have a different value for each packet depending on the situation of the transmitter. Thus, as in the embodiment of FIG. 4C, the transmitter may transmit the storage time of the packet to the receiver. For this purpose, a storage time may be included in a header 4d-10 of the packet. However, transmitting the storage time of the packet may increase a header overhead. In order to prevent this, the transmitter may report to the receiver a particular matter related to the storage time of the packet by using a 1-bit indicator 4d-20 in the header 4d-10. For example, when the value of the 1-bit indicator is 1, it may mean that a particular matter related to the storage time of the packet has occurred, and when the value of the 1-bit indicator is 0, it may mean that a particular matter related to the storage time has not occurred. In this case, the occurrence of a particular matter related to the storage time may be determined based on at least one of the following conditions.

The storage time of a packet is greater than a pre-configured threshold value.
The storage time of a packet is greater than a pre-configured threshold value.
The allowable delay margin of a packet is greater than a configured threshold value.
The allowable delay margin of a packet is less than a configured threshold value.
A packet exceeds a delay requirement.
A packet satisfies a delay requirement.
A packet deleted by a deletion timer has occurred.
The transmitter or the application program of the transmitter determines that it is necessary to report the storage time.

When a terminal of a cellular communication system is a transmitter and a base station is a receiver, the base station may pre-configure, to the terminal, what condition is to be determined as a particular matter and reported by a 1-bit indicator. This configuration may be transmitted to the terminal by the storage time report configuration message of FIG. 4B.

Figure 4E:
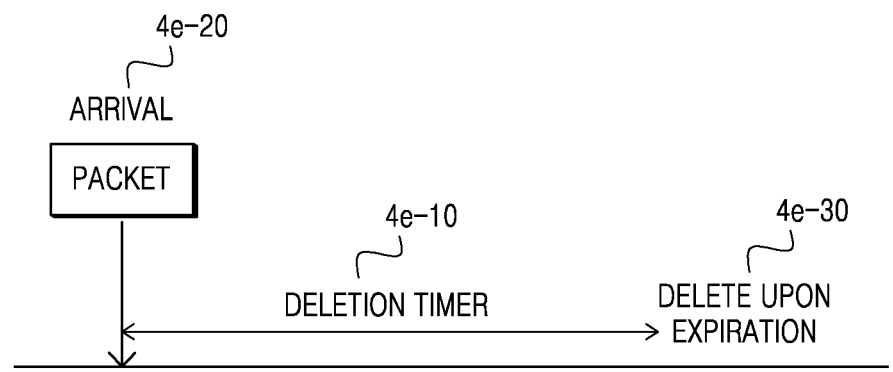
FIG. 4E is a diagram illustrating a method of operating a deletion timer for each packet, according to some embodiments.

FIG. 4E is a diagram illustrating a method of operating a deletion timer for each packet, according to some embodiments.

When a packet may not be transmitted for a long time after it arrives at the transmitter, the packet may be deleted because it may no longer be an effective packet. For this operation, a deletion timer 4e-10 may be configured. The deletion timer may be operated for every packet and may be started when the packet arrives at the transmitter (4e-20). When the packet is not transmitted until the deletion timer 4e-10 expires, the packet may be deleted in the transmitter and the transmitter may no longer store the packet for packet transmission (4e-30). According to an embodiment, regardless of whether the packet is transmitted, the timer may be started when the packet arrives at the transmitter and the transmitter may delete the packet when the deletion timer expires. According to other embodiments, when successful transmission of the packet is confirmed, the transmitter may stop the deletion timer and immediately delete the packet.

Because whether to delete the packet according to the above deletion timer may affect the quality of service (QoS) of the packet or a data flow for processing the packet, the transmitter may report the deletion information to the receiver to be used by the receiver. For example, when the transmitter is a terminal and the receiver is a base station, the terminal may notify the base station that a particular packet has been deleted by the deletion timer. According to an embodiment, the transmitter may not report the deletion information of each packet to the receiver but may report the proportion of the packet deleted by the deletion timer to the receiver. According to other embodiments, when a certain number of consecutive deletions or a certain number of cumulative deleted packets are generated by the deletion timer, the transmitter may report the corresponding information to the receiver. According to other embodiments, at the request of the base station, the terminal may report the packet deletion information to the base station. In order to report the deletion information, the transmitter may need to store the packet deletion information.

Figure 4F:
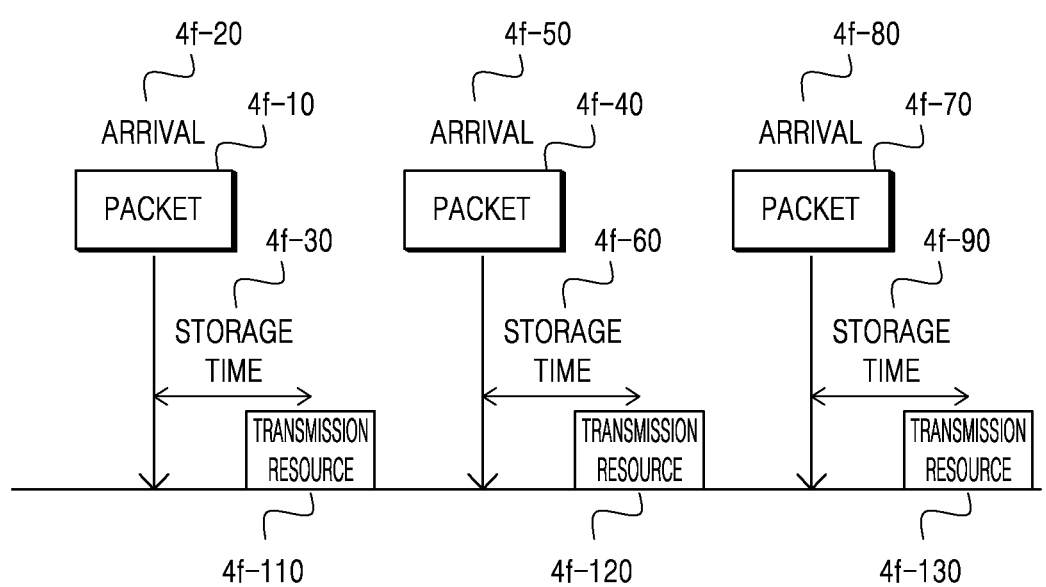
FIG. 4F is a diagram illustrating a packet storage time in periodic resource allocation according to some embodiments.

FIG. 4F is a diagram illustrating a packet storage time in periodic resource allocation according to some embodiments.

When data communication having the possibility that the storage time of the packets will seriously affect the service quality is performed and the corresponding packets (4f-10, 4f-40, and 4f-70) periodically arrives at the transmitter (4f-20, 4f-50, and 4f-80), the transmitter may be allocated periodic transmission resources for periodic packet transmission (4f-110, 4f-120, and 4f-130). When a transmitter is a terminal and a receiver is a base station in a cellular communication system, a method of allocating such periodic transmission resources may be referred to as a configured grant. Examples of the configured grant may include a method such as semi-persistent scheduling or grant-free scheduling. Even in the case of receiving the allocation of periodic transmission resources described above in FIG. 4F, when there is a difference between the actual packet transmission time and the time when the packets arrive (4f-20, 4f-50, and 4f-80), storage times may occur for these packets (4f-30, 4f-60, and 4f-90) and an excessively large storage time may affect the overall service quality. Thus, even in this case, the storage time report described above in FIG. 4B or the like may be performed.

Figure 4G:
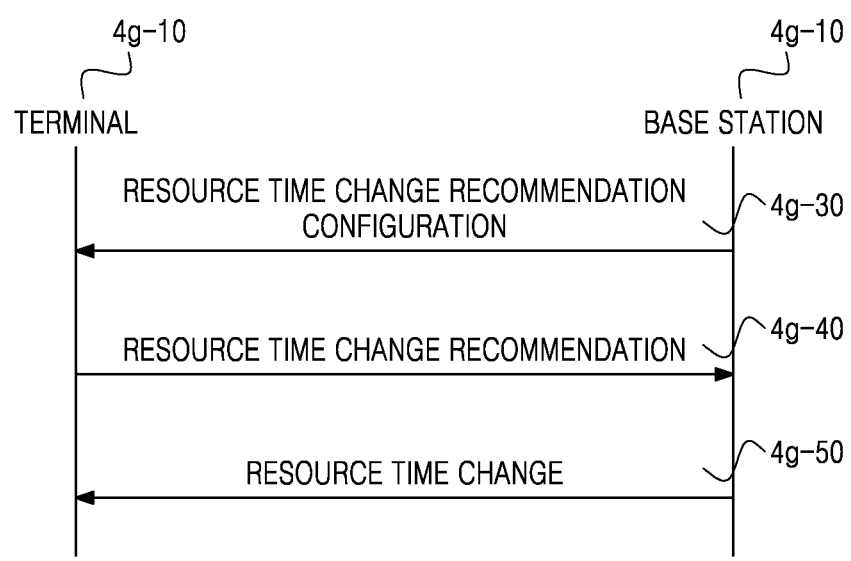
FIG. 4G is a diagram illustrating a method of changing an allocation time point of a periodic transmission resource, according to some embodiments.

FIG. 4G is a diagram illustrating a method of changing an allocation time point of a periodic transmission resource in a cellular communication system, according to some embodiments.

As described above in FIG. 4F, when a packet storage time occurs despite periodic transmission resource allocation, the packet storage time may be reduced by changing the transmission resource allocation time point. For this purpose, a base station 4g-20 may configure, to a terminal 4g-10, a condition for transmitting a recommendation message 4g-40 for changing the transmission resource allocation time point (4g-30). A resource time point change recommendation configuration message 4g-30 may include a configuration for at what time point the terminal 4g-10 is to transmit the resource time point change recommendation message. This condition may include at least one of the following examples.

The storage time of a packet is greater than a pre-configured threshold value.
The storage time of a packet is less than a pre-configured threshold value.
The allowable delay margin of a packet is greater than a configured threshold value.
The allowable delay margin of a packet is less than a configured threshold value.

A packet exceeds a delay requirement.

A packet satisfies a delay requirement.

The storage time of packets in a QoS flow or a radio bearer is greater than a pre-configured threshold value.

The storage time of packets in a QoS flow or a radio bearer is less than a pre-configured threshold value.

The allowable delay margin of a packet in a QoS flow or a radio bearer is greater than a configured threshold value.

The allowable delay margin of a packet in a QoS flow or a radio bearer is less than a configured threshold value.

A packet in a QoS flow or a radio bearer exceeds a delay requirement.

A packet in a QoS flow or a radio bearer satisfies a delay requirement.

The proportion of a packet the storage time of which is greater than a pre-configured threshold value is greater than a configured threshold value.

The proportion of a packet the storage time of which is greater than a pre-configured threshold value is less than a configured threshold value.

The proportion of a packet exceeding a delay requirement is greater than a configured threshold value.

The proportion of a packet exceeding a delay requirement is greater than a configured threshold value.

The proportion of a packet deleted by a deletion timer is greater than a configured threshold value.

The proportion of a packet deleted by a deletion timer is less than a configured threshold value.

The terminal or the application program of the terminal determines that it is necessary to report the storage time.

Periodic transmission (every certain time)

It is transmitted when the terminal receives the resource time point change recommendation configuration message.

When the terminal 4g-10 satisfies the condition configured in the storage time report configuration message or when the terminal 4g-10 determines that it is necessary to transmit the resource time point change recommendation message, the terminal 4g-10 may transmit the resource time point change recommendation message to base station 4g-20 (4g-40). In this case, a value that may be included in the resource time point change recommendation message may include at least one of the following.

The adjustment value of the transmission resource allocation time point

The DRB ID or QoS flow ID for requesting the change of the transmission resource allocation point The adjustment value of the transmission resource allocation period The packet arrival period The average storage time of the packet The storage time of the recent packet The average allowable delay margin of the packet The rate at which the packet storage time exceeds a configured threshold value The proportion of the packet deleted by the deletion timer The proportion of the packet exceeding a delay requirement The delay requirement of the DRB or the QoS flow In this case, the adjustment value of the transmission resource allocation time point may be a positive value or a negative value. In other words, it may be requested or recommended that the resource allocation time point should be adjusted forward or backward than the current time point. In this case, the unit of the adjustment value of the resource allocation time point may be a time component such as second (s), millisecond (ms), and microsecond (μs). According to an embodiment, the unit of the adjustment value of the resource allocation time point may be a system frame number (SFN), a frame, a subframe, a slot, or a symbol length that is a value used in the communication system. Also, because the above values may be affected by subcarrier spacing (SCS), subcarrier spacing information may be transmitted together.

After receiving a resource time point change recommendation message 4g-40, the base station 4g-20 may indicate a resource time point change by synthetically considering this message and the situation of the base station 4g-20 (4g-50). In this case, the base station 4g-20 may change the resource time point by considering the service quality requirement of the packet transmitted by the terminal. In this case, the resource time point change may be performed by configuring a relative time value based on the currently allocated time point or by re-configuring the resource allocation time point or period.

Figure 4H:
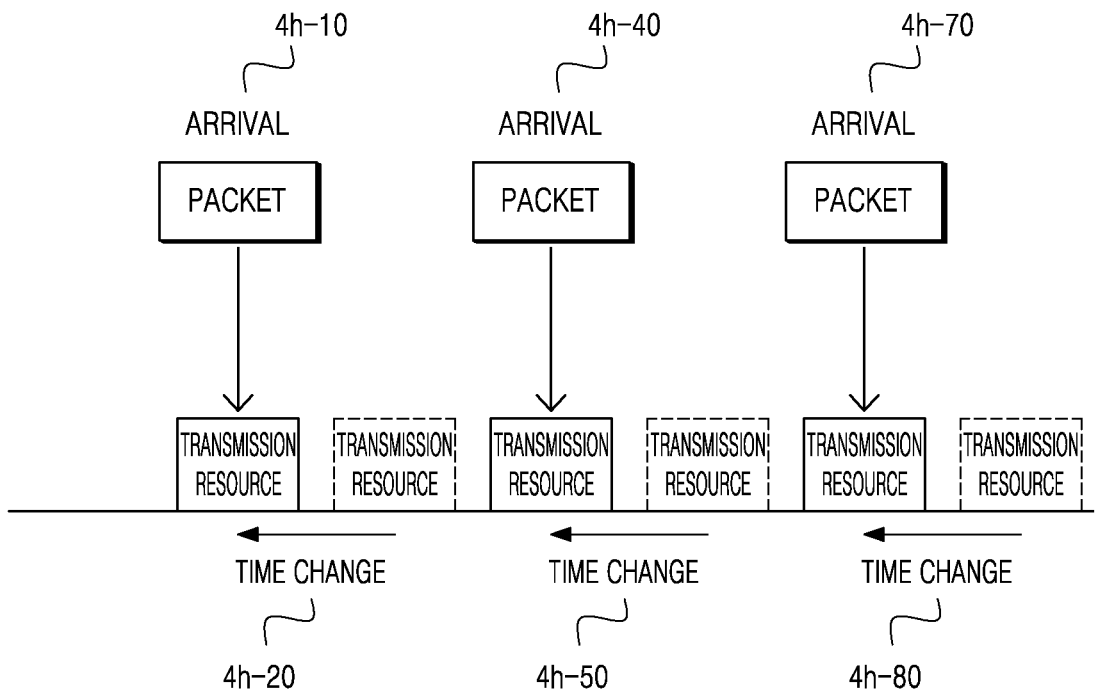
FIG. 4H is a diagram illustrating a method of changing an allocation time point of a periodic transmission resource, according to some embodiments.

FIG. 4H is a diagram illustrating a method of changing an allocation time point of a periodic transmission resource, according to some embodiments.

When the storage time of packets 4h-10, 4h-40, and 4h-70 occurs in the transmitter despite periodic transmission resource allocation, the packet storage time may be reduced by changing the transmission resource allocation time point. The transmission resource allocation time point change may be performed in an apparatus allocating the transmission resource, and in the cellular communication system, the base station may perform this function. For this purpose, the base station may use the information of the resource time point change recommendation message described in FIG. 4G or may use the information of the storage time report message described in FIG. 4B. In the embodiment of FIG. 4H, the transmission resource allocation time point may be changed to the packet arrival time (4h-20, 4h-50, and 4h-80). However, this time point may not need to exactly match the packet arrival time and may be allocated as a particular time point for the purpose of reducing the waiting time of the packet. In this case, the apparatus allocating the transmission resource may change the resource time point by considering the service quality requirement of the packet transmitted by the terminal. In this case, the resource time point change may be performed by configuring a relative time value based on the currently allocated time point or by re-configuring the resource allocation time point or period.

Figure 4I:
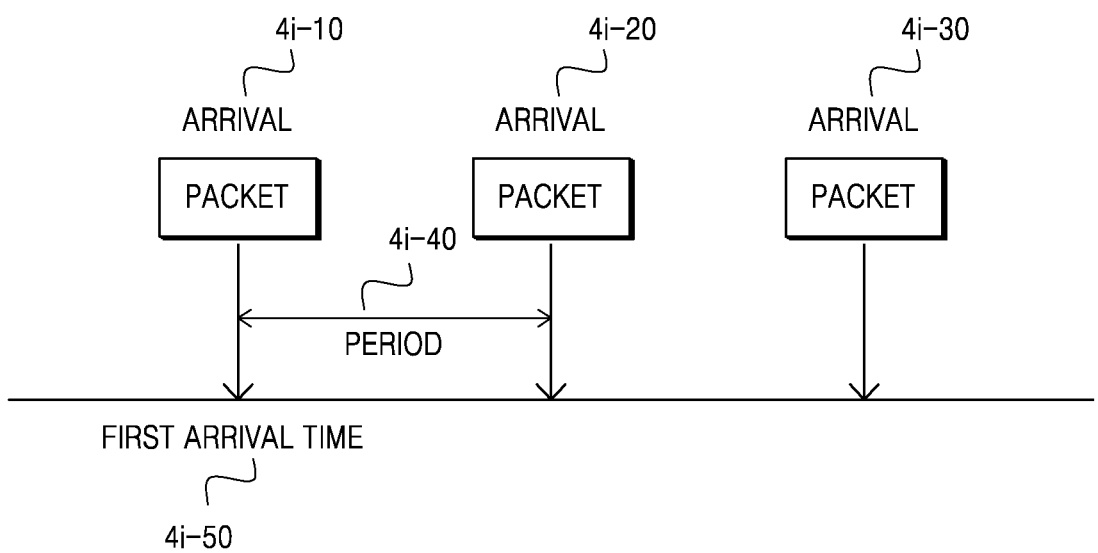
FIG. 4I is a diagram illustrating periodic packet transmission information according to some embodiments.

FIG. 4I is a diagram illustrating periodic packet transmission information according to some embodiments.

When packets arrive periodically, the corresponding information may be transmitted to an apparatus allocating the transmission resource. In a cellular communication system, a base station may perform this function, and a terminal may report the corresponding information for uplink packets to the base station. In this case, the terminal may recognize, by an application or the like, that packets 4i-10, 4i-20, and 4i-30 will arrive periodically. According to other embodiments, the terminal may recognize that a periodic packet will arrive at an arrival time 4i-50 of a first packet 4i-10. In this case, when an arrival time 4i-50 of the first periodic packet and the arrival interval between packets, that is, a period 4i-40, may be known, the terminal may know at what time points the subsequent packets arrive. Also, when the size of packets that occurs periodically or the data rate of packets that occur may be known, the amount of resources to be allocated may be known. Thus, the transmitter may report this information to the apparatus allocating the transmission resource. In the cellular communication system, the terminal may transmit this information by including the same in the resource time point change recommendation message described in FIG. 4G.

In this case, the unit of the first packet arrival time point and period value may be a time component such as second (s), millisecond (ms), and microsecond (μs). According to an embodiment, the unit of the first packet arrival time point or period value may be a system frame number (SFN), a frame, a subframe, a slot, or a symbol length that is a value used in the communication system. Also, because the above values may be affected by subcarrier spacing (SCS), subcarrier spacing information may be transmitted together.

Figure 4J:
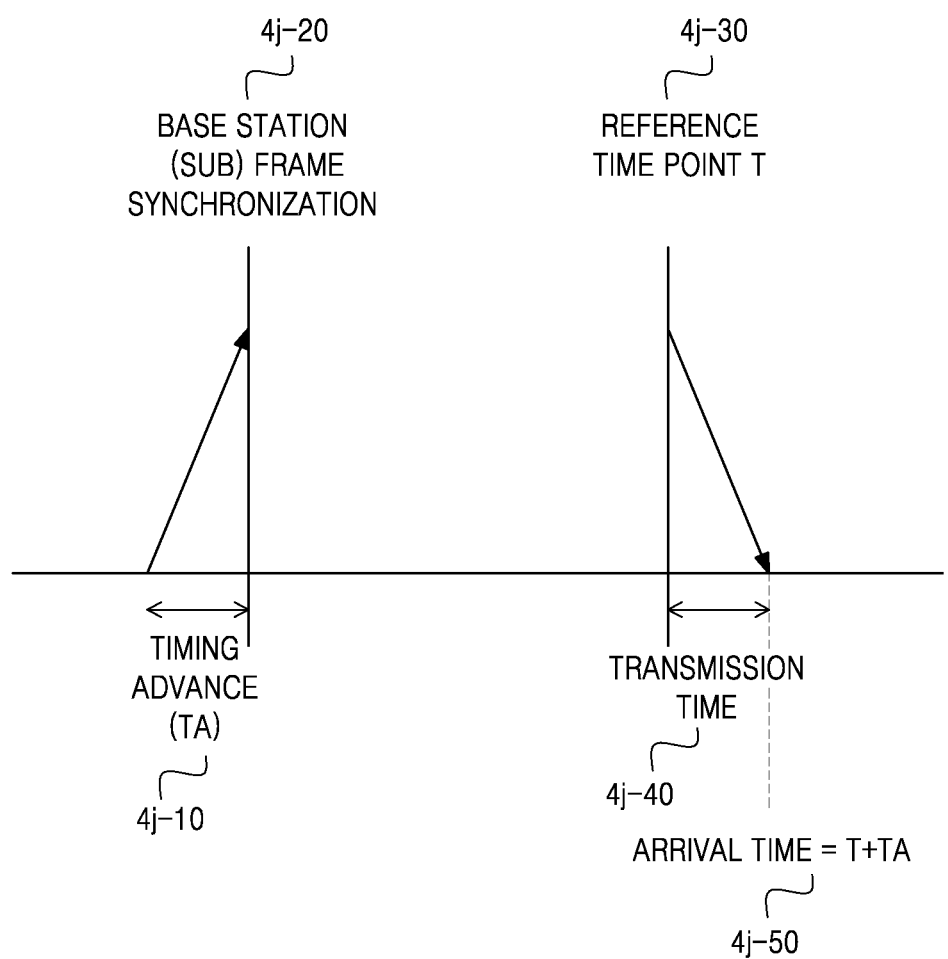
FIG. 4J is a diagram illustrating a method of determining a time used in embodiments of the disclosure, according to some embodiments.

FIG. 4J is a diagram illustrating a method of determining a time used in embodiments of the disclosure, according to some embodiments.

When the communication method proposed in the disclosure has a characteristic of having a short delay time, all the time units used in the disclosure may also operate as short time units of about microseconds (μs). For this purpose, synchronization between the base station and the terminal may be required. For this purpose, a timing advance (TA) value 4j-10 used by the terminal for uplink transmission may be used. The timing advance may be a value used for base station frame or subframe synchronization (4j-20) and may be a value adjusted by the base station and the terminal during random access. Particularly, when the terminal transmits a packet to the base station, a delay time may occur due to a propagation path. In consideration of this, the terminal may transmit the packet as early as the timing advance value configured by synchronizing the actual packet reception time of the base station with the base station frame or subframe synchronization time. Thus, the timing advance value may be considered as the time when the packet is transmitted.

Thereafter, the base station may transmit reference time information. The reference time information may be transmitted as an RRC message or a system information block (SIB). In this case, an indicated reference time point and a time T thereof (4j-30) may be transmitted to the terminal. However, as for the time T recognized by the terminal, because there is an error (4j-40) as much as the transmission time taken for actual transmission of the packet from base station to the terminal, the time point when the packet transmitted at the reference time point arrives at the terminal may be a (T+TA) time point (4j-50). By using the accurate time information corrected for these values, the method described in the embodiments of FIGS. 4A to 4I may be used.

Figure 4K:
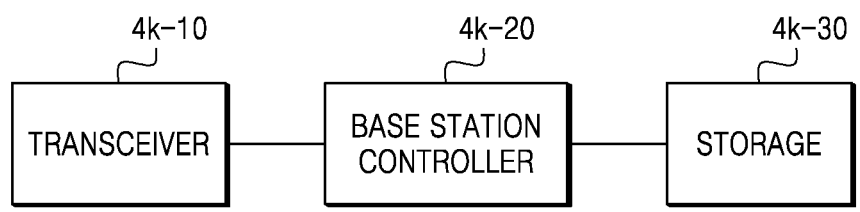
FIG. 4K is a diagram illustrating a structure of a base station according to some embodiments.

FIG. 4K is a diagram illustrating a structure of a base station according to some embodiments.

Referring to FIG. 4K, the base station may include a transceiver 4k-10, a controller 4k-20, and a storage 4k-30. In the disclosure, the controller 4k-20 may be defined as a circuit, an application-specific integrated circuit, or at least one processor.

The transceiver 4k-10 may exchange signals with other network entities. For example, the transceiver 4k-10 may transmit system information to the terminal and may transmit a synchronization signal or a reference signal thereto.

The controller 4k-20 may control an overall operation of the base station according to the embodiments of the disclosure. For example, the controller 4k-20 may control a signal flow between the respective blocks to perform an operation according to the flowcharts described above. According to some embodiments, the controller 4k-20 may control the components of the base station to transmit a storage time report configuration message, to transmit a resource time point change recommendation configuration message, and to transmit a resource time point change recommendation configuration message.

The storage 4k-30 may store at least one of information transmitted/received through the transceiver 4k-10 and information generated through the controller 4k-20.

Figure 4L:
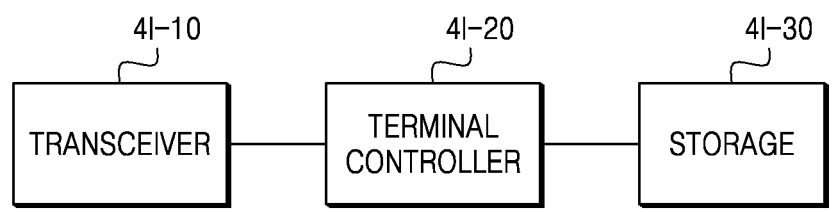
FIG. 4L is a diagram illustrating a structure of a terminal according to some embodiments.

FIG. 4L is a diagram illustrating a structure of a terminal according to some embodiments.

Referring to FIG. 4L, the terminal may include a transceiver 4l-10, a controller 4l-20, and a storage 4l-30. In the disclosure, the controller 4l-20 may be defined as a circuit, an application-specific integrated circuit, or at least one processor.

The transceiver 4l-10 may exchange signals with other network entities. For example, the transceiver 4l-10 may receive system information from the base station and may receive a synchronization signal or a reference signal therefrom.

The controller 4l-20 may control an overall operation of the terminal according to the embodiments of the disclosure. For example, the controller 4l-20 may control a signal flow between the respective blocks to perform an operation according to the flowcharts described above. According to some embodiments, the controller 4l-20 may control the components of the terminal to perform a storage time report and to transmit a resource time point change recommendation message.

The storage 4l-30 may store at least one of information transmitted/received through the transceiver 4l-10 and information generated through the controller 4l-20.

The methods according to the embodiments of the disclosure described in the specification or the claims may be implemented by hardware, software, or a combination thereof.

When the methods are implemented by software, a computer-readable storage medium or a computer program product may be provided to store one or more programs (software modules). The one or more programs stored in the computer-readable storage medium or the computer program product may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored a memory including any combination of some or all thereof. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured as any combination thereof. Such a storage device may be connected through an external port to an apparatus performing embodiments of the disclosure. Also, a separate storage device on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

It should be understood that the embodiments of the disclosure described herein should be considered in a descriptive sense only and not for purposes of limitation. That is, it will be understood by those of ordinary skill in the art that various changes in form and details may be made in the embodiments of the disclosure without departing from the spirit and scope of the disclosure. Also, the embodiments of the disclosure may be operated in combination when necessary. For example, portions of an embodiment and another embodiment of the disclosure may be combined with each other. Also, embodiments of the disclosure may be implemented in other systems such as LTE systems and 5G or NR systems, and other modifications may be made therein based on the spirit of the above embodiments of the disclosure.

The invention claimed is:

1. A method, performed by a terminal, the method comprising:
   receiving, from a base station, downlink control information (DCI) comprising indication information indicating public warning system (PWS) information which is to be broadcast in a system bandwidth; and
   receiving, based on the indication information, a system information block (SIB) in the system bandwidth, the SIB comprising the PWS information; and
   wherein the terminal supports a coverage enhancement (CE) mode, and
   wherein the DCI is received on an MTC physical downlink control channel (MPDCCH).

2. The method of claim 1, wherein the PWS information includes commercial mobile alert system information or earthquake and tsunami warning system information.

3. The method of claim 1, wherein the DCI is scrambled by a system information-radio network temporary identifier (SI-RNTI).

4. The method of claim 1, wherein the SIB is at least one of SIB10, SIB11, or SIB12.

5. A method, performed by a base station, the method comprising:
   transmitting, to a terminal, downlink control information (DCI) comprising indication information indicating public warning system (PWS) information which is to be broadcast in a system bandwidth; and
   transmitting, based on the indication information, a system information block (SIB) in the system bandwidth, the SIB comprising the PWS information; and
   wherein the terminal supports a coverage enhancement (CE) mode, and
   wherein the DCI is transmitted on MTC physical downlink control channel (MPDCCH).

6. The method of claim 5, wherein the PWS information includes commercial mobile alert system information or earthquake and tsunami warning system information.

7. The method of claim 5, wherein the DCI is scrambled by a system information-radio network temporary identifier (SI-RNTI).

8. A terminal supporting a coverage enhancement (CE) mode, the terminal comprising:
   a transceiver; and
   at least one processor connected to the transceiver,
   wherein the at least one processor is configured to:
   receive, from a base station, downlink control information (DCI) comprising indication information indicating public warning system (PWS) information which is to be broadcast in a system bandwidth, and
   receive, based on the indication information, a system information block (SIB) in the system bandwidth, the SIB comprising the PWS information, and
   wherein the terminal supports a coverage enhancement (CE) mode, and
   wherein the DCI is received on MTC physical downlink control channel (MPDCCH).

9. The terminal of claim 8, wherein the PWS information includes commercial mobile alert system information or earthquake and tsunami warning system information.

10. The terminal of claim 8, wherein the DCI is scrambled by a system information-radio network temporary identifier (SI-RNTI).

11. The terminal of claim 8, wherein the SIB is at least one of SIB10, SIB11, or SIB12.

12. A base station supporting a coverage enhancement (CE) mode, the base station comprising:
    a transceiver; and
    at least one processor connected to the transceiver,
    wherein the at least one processor is configured to:
    transmit, to a terminal, downlink control information (DCI) comprising indication information associated with indicating public warning system (PWS) information which is to be broadcast in a system bandwidth, and
    transmit, based on the indication information, a system information block (SIB) in the system bandwidth, the SIB comprising the PWS information, and
    wherein the terminal supports a coverage enhancement (CE) mode, and
    wherein the DCI is transmitted on MTC physical downlink control channel (MPDCCH).

13. The base station of claim 12, wherein the PWS information includes commercial mobile alert system information or earthquake and tsunami warning system information.

14. The base station of claim 12, wherein the DCI is scrambled by a system information-radio network temporary identifier (SI-RNTI).

* * * * *